US007946486B2

(12) United States Patent
Nakamura

(10) Patent No.: US 7,946,486 B2
(45) Date of Patent: May 24, 2011

(54) QUALITY MANAGEMENT METHOD FOR AEROSPACE MACHINE ELEMENT PRODUCT AND AEROSPACE BEARING

(75) Inventor: Shouhei Nakamura, Nagoya (JP)

(73) Assignee: NTN Corporation, Osaka (JP)

( * ) Notice: Subject to any disclaimer, the term of this patent is extended or adjusted under 35 U.S.C. 154(b) by 882 days.

(21) Appl. No.: 11/659,814

(22) PCT Filed: Feb. 24, 2005

(86) PCT No.: PCT/JP2005/002975
§ 371 (c)(1),
(2), (4) Date: Sep. 24, 2007

(87) PCT Pub. No.: WO2006/016431
PCT Pub. Date: Feb. 16, 2006

(65) Prior Publication Data
US 2008/0191004 A1    Aug. 14, 2008

(30) Foreign Application Priority Data

Aug. 10, 2004    (JP) ................................. 2004-233527

(51) Int. Cl.
*G06Q 90/00* (2006.01)
(52) U.S. Cl. ........................ 235/385; 235/376
(58) Field of Classification Search .................. 235/376, 235/385
See application file for complete search history.

(56) References Cited

U.S. PATENT DOCUMENTS

| 7,158,031 B2 * | 1/2007 | Tuttle | 340/572.1 |
| 2002/0186134 A1 | 12/2002 | Rehfus et al. | |

FOREIGN PATENT DOCUMENTS

| EP | 1 151 920 | 11/2001 |
| JP | 2-030447 | 1/1990 |
| JP | 2-250755 | 10/1990 |
| JP | 11-255224 | 9/1999 |
| JP | 2000-66705 | 3/2000 |
| JP | 2000-306009 | 11/2000 |
| JP | 2001-100830 | 4/2001 |
| JP | 2002-123654 | 4/2002 |
| JP | 2002-169858 | 6/2002 |
| JP | 2002-536726 | 10/2002 |
| JP | 2002-334134 | 11/2002 |
| JP | 2003-067028 | 3/2003 |
| JP | 2003-256792 | 9/2003 |
| JP | 2003-271216 | 9/2003 |
| WO | 00/45324 | 8/2000 |

* cited by examiner

Primary Examiner — Daniel A Hess
(74) Attorney, Agent, or Firm — Clark & Brody

(57) ABSTRACT

A aerospace machine element product (1) to be managed comprises a plurality of assembled components (2) ((1) to (3)). Each of the plurality of components (2) ((1) to (3)) is manufactured through a material purchase process (S1), a forging process (S2), a heat treatment process (S3), a grinding process (S4), surface treatment process (S5), and inspection process (S6). The information of the processes (S1) to (S2) is recorded on an IC tag (4) together with the lot numbers of the processes. After the components (2) have been assembled in the aerospace machine element product (1), the recorded information regarding the components (2) on the IC tag (4) is recorded in a management computer system (11) so as to be related to a manufacturing number or a manufacturing lot number. Another IC tag (10) is attached to the aerospace machine element product (1) and the manufacturing number or the lot number is recorded on the IC tag (10). In addition, processing condition information about the forging, heat treatment, grinding, surface treatment processes is recorded on this IC tag (10).

14 Claims, 11 Drawing Sheets

FIG.13
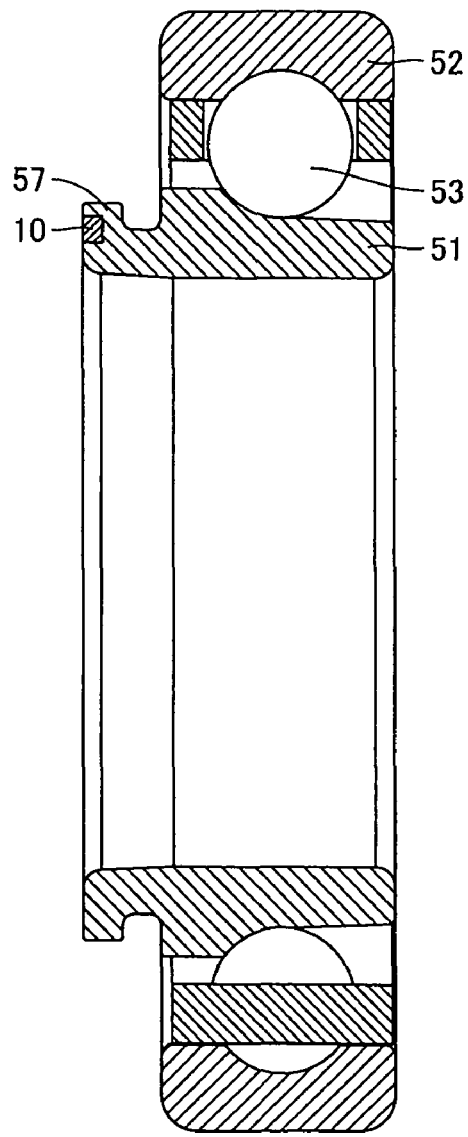
(A)
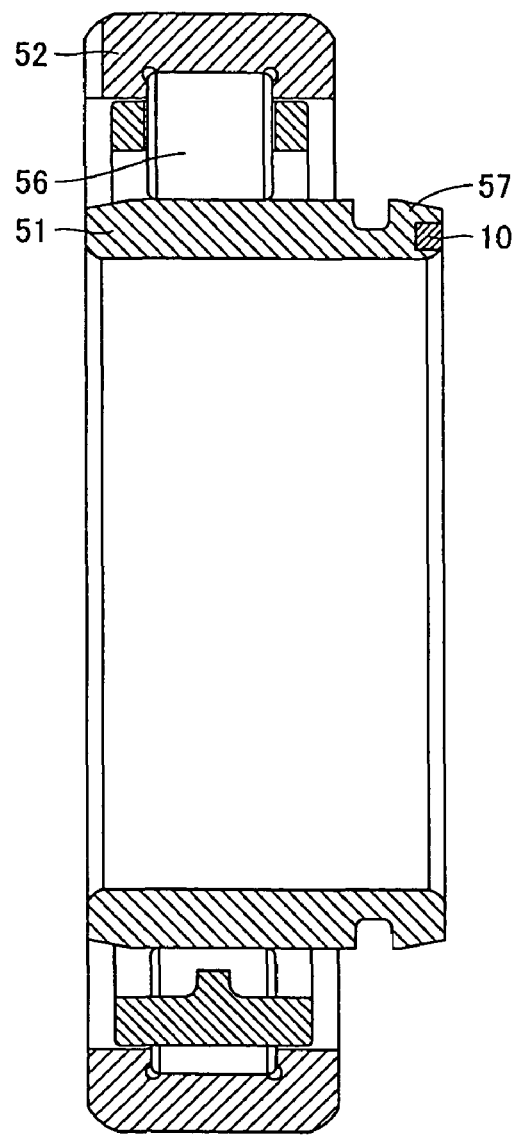
(B)

QUALITY MANAGEMENT METHOD FOR AEROSPACE MACHINE ELEMENT PRODUCT AND AEROSPACE BEARING

TECHNICAL FIELD

The present invention relates to a quality management method for an aerospace machine element product and an aerospace bearing. More particularly, the present invention relates to a quality management method for an aerospace machine element product such as a rolling bearing and sliding bearing used in an aircraft including a flying object such as a fixed wing, a rotating wing and missile or a space appliance including a rocket, a rocket engine and an artificial satellite, and an aerospace bearing.

BACKGROUND ART

The aircraft has been getting bigger recently and its body has several hundred seats in practical use. Since many lives are lost in case of aircraft crash, very strict quality management is to be performed at the time of manufacturing the aircraft. This strict quality management is implemented not only for the manufacturing processes of the body of the aircraft but also for each machine element product contained in the engine and the like in the aircraft.

In addition, an aerospace equipment is originally required for traceability in which the history, application or whereabouts of an object to be considered is traceable. This is because when the aerospace equipment has an accident, it is necessary to immediately specify its cause and when there is a defective in a machine element product, it is necessary to immediately specify and exchange the defective part.

Regarding each machine element product of the aircraft, as for a bearing used in a jet engine for example, its material, its machine tool and the skill of an engineer have to be qualified every machine element and when any of them is not qualified, the machine element cannot be delivered.

This quality management is necessary for not only the aircraft containing a flying object such as a fixed wing, a rotating wing and a missile, but also for a space appliance including a rocket, a rocket engine, and an artificial satellite.

The machine element product is mainly managed as follows.

First, as for the material, a process lot number of material showing the material constituent or the furnace in which the material is manufactured, a specification number and a revision letter are managed. The revision letter represents the number of times of the revision from the original specification. As for turning/forging, a time, a place and a facility in which the process is performed and its processing condition are managed.

As for a heat treatment, a specification number and a revision letter in a specification in which a temperature condition and the like are determined and a heat treatment condition are managed. As for grinding, a time, the machine used and its condition are managed. As for a surface treatment, the kind of the surface treatment, a specification number and a revision letter and the like are managed. As for an inspection, a nondestructive inspection is mainly conducted, and the kind of the nondestructive inspection, a specification number and a revision letter and the like are managed. As for rust-preventing and packaging, the kind of a rust-preventing oil or packaging, a specification number and a revision letter and the like are managed.

According to the quality management for each machine element product, although the component such as a ring, a rolling element, a retainer or the like is forged, heat treated and ground by the lot, the completed machine element product is not managed by the lot but it is managed individually.

As to the quality management method in which the above manufacturing history is clarified, the information is conventionally recorded on a document and stored in general, and when the customer requests the information, the document has to be managed so that the same is immediately provide to the customer. Moreover, as long as the machine element product is used, the document has to be stored for a long period of time, so that the stored documents become enormous at the quality management section in the manufacturer and space for the documents is needed.

In order to reduce the document amount, measures such that the information generated at each process is inputted to the computer terminal accessible to a database and the like are taken, but actually, the information is stored in the document to backup the information in view of the risk of data extinction.

Meanwhile, an IC tag is coming to be used in physical distribution management or inventory management. For example, management through the manufacturing to abandonment stages using the IC tag in the manufacturing of a product such as a car is proposed in the above Japanese Unexamined Patent Publication No. 2002-169858. Since information can be recorded and read to and from the IC tag without contact and the storage capacity of the IC tag is large, high degree of management can be expected.

According to a conventional example of the quality management method using the IC tag, various kinds of information about a machine element product is directly recorded on the IC tag attached to the machine element product, or identification information is recorded on the IC tag and material and lot management information and various kinds of history data and the like about the machine element product is provided by making reference to a database.

However, the cause of a defect generated in the machine element product cannot be specified with the information about the machine element product only in some cases. For example, a difference in quality is generated by a difference in processing condition at each process and such difference caused by the difference in processing condition cannot be recognized from the inspected result in some cases. Since the machine element product such as the rolling bearing and the like comprises a plurality of components, even when the inspected result of the assembled machine element product itself and the like can be known, a defect caused by the difference in quality of each component cannot be specified.

Especially, in the case of the machine element product having a rolling element of a rolling bearing and the like, since a slight difference in material and precision leads to a great difference in performance of the machine element product, which is hard to deal with in the conventional example of the quality management method using the IC tag.

Furthermore, as for process management, according to the conventional management method in which the information is written on the slip or inputted to a terminal every process, the writing and inputting are troublesome, so that it is difficult to record various kinds of information in detail. Especially, according to a machine element product constituted by assembling a plurality of components like the rolling bearing in which components are produced through material purchase, a forging process, a heat treatment process, a grinding process and a surface treatment process, by the lot every process, the management at the manufacturing processes of the component is complicated and it takes a lot of trouble to handwrite and input the information. Therefore, it is difficult to sufficiently answer the request for detailed history information about the machine element product and management cost becomes high.

Thus, it is considered to use the IC tag. However, the management for the product such as a car cannot be applied to the above machine element product. According to the above Japanese Unexamined Patent Publication No. 2002-169858, the IC tag is attached to the car that is an object to be managed and information about each process is recorded on the IC tag. The IC tag is attached to a frame and the like.

However, according to the machine element product such as the rolling bearing, since there is no completed reference component like the frame in the car and each component is manufactured through a forging and heat treatment processes in the manufacturing process, the IC tag cannot be attached to the machine element product itself In addition, according to the machine element product such as the rolling bearing, since each of an inner ring, an outer ring, a rolling element and the like is managed through the material purchase, the forging process, the heat treatment process, the grinding process and the surface treatment process, when the IC tag is to be used in the quality management, it is difficult to decide how to use it specifically and use it effectively.

DISCLOSURE OF THE INVENTION

Thus, it is an object of the present invention to provide a quality management method for an aerospace machine element product individually inspected and comprising a plurality of assembled components each manufactured through a forging process, a heat treatment process and the like, in which detailed history information from material purchase of each component to inspected contents of a completed machine element product can be easily managed in each machine element product on one-to-one basis.

It is another object of the present invention to provide an aerospace bearing that is highly traceable and whose processing condition information about a forging process, a heat treatment process, a grinding process and the like can be easily confirmed after its shipment or after delivered to a customer on one-to-one basis.

In short, according to the method of the present invention, an IC tag is attached to the aerospace machine element product and information regarding quality management of the aerospace machine element product is traceable from recorded information on the IC tag only.

More specifically, the quality management method of managing an aerospace machine element product by recording at least one of predetermined manufacturing information about material purchase, a forging process, a heat treatment process, a grinding process, and surface treatment process regarding a plurality of components that constitute the aerospace machine element product, on an IC tag to and from which information can be recorded and read, comprises a process for attaching the IC tag to any of the plurality of components that constitute the aerospace machine element product at the time of manufacturing or at the time of completion of the manufacturing of the aerospace machine element product, a process for recording specific information including any of information about a customer, information about a request from the customer, and information about a manufacturer, and recording any of processing condition information and material information of at least one process of the forging process, the heat treatment process, the grinding process and the surface treatment process about the aerospace machine element product, every component product, on the IC tag attached to any of the plurality of components, and an information reading and using process for reading the recorded information on the IC tag and confirming any of the specific information, the processing condition information, and the material information, from the read information at any time after shipment.

According to this method, in the information reading and using process, the processing condition information or the material information of any one of the forging process, the heat treatment process, the grinding process and the surface treatment process can be confirmed at any time after the shipment. In addition, since even the processing condition information and the like can be confirmed, even in the machine element product that requires strict quality management and precision like the aerospace machine element product, the cause of a trouble can be easily specified when defect is caused. In this method, since the information can be managed with the IC tag only without using a database, the processing condition information can be read without needing a communication facility and an access right to the database. In addition, the term "aerospace machine element product" means a machine element used in an aircraft and a space equipment and commercially available by itself.

According to one embodiment of the present invention, the quality management method comprises a process of preparing a database storing the specific information of any of the information about the customer, the information about the request from the customer, and the information about the manufacturer, and storing the predetermined processing condition information and the material information about the material purchase, the forging process, the heat treatment process, the grinding process, and the surface treatment process of the plurality of components that constitute the aerospace machine element product so as to be related to identification information, from which stored contents can be extracted based on the identification information, and a process for recording into the IC tag the specific information, the processing condition information, and the material information stored in the database by extracting the information based on the identification information.

According to this embodiment, in the information reading and using process, the processing condition information or the material information of any one of the forging process, the heat treatment process, the grinding process and the surface treatment process can be confirmed at any time after the shipment. Therefore, the cause of the trouble of even the machine element product that requires strict quality management and precision like the aerospace machine element product, the cause of a trouble can be easily specified. In addition, while the identification information is recorded on the IC tag attached to the aerospace machine element product, various kinds of information is recorded in the database so as to be related to the identification information, so that a lot of information can be extracted from the database without relying on the IC tag having limited capacity. Furthermore, the remaining storage capacity of the IC tag can be used for various kinds of history management and the like after the shipment and after the delivery to the customer.

According to another aspect of the present invention, a quality management method of managing an aerospace machine element product uses a database and an IC tag. The database stores any of specific information including any of information about a customer, information about a request from the customer and information about a manufacturer, and predetermined manufacturing information about material purchase, a forging process, a heat treatment process, a grinding process and a surface treatment process regarding an aerospace machine element product comprising a plurality of components for aircraft and a space equipment. The stored information is related to identification information and the stored contents can be extracted using the identification information. The information to and from the IC tag can be recorded and read. The quality control method comprises a process for attaching the IC tag to any of the plurality of components that constitute the aerospace machine element product at the time of manufacturing or at the completion of the manufacturing of the aerospace machine element product, a process for writing identification information about the aerospace machine element product based on the database at the time of shipment or before delivery to the customer, and recording specific information including any of information about a customer, information about the request from the customer and information regarding manufacturer, and at least one information about a manufactured date, a manufactured place, the brand of enclosed grease, the clearance between the components, and rust-preventing and packaging information, and instructions for handling regarding the aerospace machine element product, on the IC tag attached to each aerospace machine element product, and an information reading and using process for executing any of confirmation of the specific information including the information about the customer, the information about the request from the customer, or the information about the manufacturer, confirmation of a purchased material, confirmation of a manufacturing process, at least one of confirmation of processing condition and material information, and confirmation of an inspected result from the information read from the IC tag, or from the information obtained by comparing the read information to the database at any time after the shipment.

According to this method, any of confirmation of the purchased material, the confirmation of the manufacturing process, confirmation of its processing condition, and confirmation of the inspected result can be performed from the information read from the IC tag or the information provided by comparing the read information to the database, in the information reading and using process at any time after the shipment.

In addition, any of the information about the manufactured date, the manufactured place, the brand of the enclosed grease, the clearance between the components, and the rust-preventing and packaging, and instructions for handling can be confirmed. Since the information about the manufactured date, the manufactured place, the brand of enclosed grease, the clearance between the components, and rust-preventing and packaging, and instructions for handling are to be known immediately in many cases, when it can be directly read from the IC tag without referring to the database, it is very convenient in view of a facility and labor.

Although there are many kinds of greases for a high temperature or a low temperature depending on its usage, since it is difficult to recognize it from the outside, it is convenient that the grease can be recognized from the IC tag. Furthermore, since the grease deteriorates with the course of time, when the brand of the enclosed grease is known together with the manufactured date, it can be easily confirmed whether the grease can be used as it is or it needs to be exchanged at the time of delivery to the customer, so that the product having old grease is prevented from being delivered to the customer. The clearance between the components means a radial clearance and the like in the rolling bearing.

According to the present invention, every quality management method of the aerospace machine element product may have the following processes. That is, the quality management method of managing the aerospace machine element product comprises a process for recording the predetermined manufacturing information about the material purchase, the forging process, the heat treatment process, the grinding process and the surface treatment process of the component of the aerospace machine element product, on an IC tag for a manufacturing process, prepared for each lot number of the component at each process, and a process for reading the information recorded on the IC tag for the manufacturing process and recording a part or all of the read information on the IC tag attached to the aerospace machine element product, in which the manufacturing information recorded on the IC tag for the manufacturing process includes at least one of processing condition information and material information in at least one of the forging process, the heat treatment process, the grinding process, and surface treatment process.

Thus, since the manufacturing information about the material purchase, the forging process, the heat treatment process, the grinding process and the surface treatment process is recorded on the IC tag for the manufacturing process prepared for each lot number of the component in the manufacturing process for each component at each process, the information can be recorded in detail as compared with the case where it is recorded on a handwriting slip. Furthermore, unlike the case where the information is inputted from the terminal to the computer, since the information is recorded on the IC tag, it is easy to recognize the IC tag by sight, so that inputting operation becomes clear and an error is not likely to be generated.

Furthermore, unlike the case where various kinds of information from the material purchase of the component to various processes of the grinding process is all recorded in the computer, since the recorded information is stored in the IC tag, the computer can reduce its burden and the management becomes easy. Therefore, the more detailed information can be easily managed. When the lot section is changed every process, the IC tag for each lot number of the component is to be prepared every lot.

Preferably, the quality management method may comprise a process for recording the predetermined manufacturing information about the material purchase, the forging process, the heat treatment process, the grinding process, and the surface treatment process of the component of the aerospace machine element product, in a database for management at the time of manufacturing so as to be related to the lot number or the identification number specific to the component, and a process for recording on the IC tag attached to the aerospace machine element product the recorded information in the database.

A quality management method for an aerospace machine element product according to still another aspect of the present invention is a quality management method of managing an aerospace machine element product to be individually inspected. That is, according to a quality management method of managing an aerospace machine element product having a plurality of components manufactured through material purchase, a forging process, a heat treatment process, a grinding process and a surface treatment process to be assembled, the each component comprises the following processes (1) to (6) and the aerospace machine element product having the assembled components comprises processes as will be described below.

(1) A process for recording the material lot number of a corresponding material lot and information about a purchased material, on an IC tag prepared with respect to each material lot, at the time of purchasing of the component.

(2) A process for preparing the IC tag for each material lot or an IC tag succeeding the recorded information of the IC tag for each material lot with respect to each forging lot and recording the forging lot number of a corresponding forging lot and information provided at the forging process on the IC tag at the forging process.
(3) A process for preparing the IC tag for each forging lot or an IC tag succeeding the recorded information of the IC tag for each forging lot with respect to each heat treatment lot and recording the heat treatment lot number of a corresponding heat treatment lot and information provided at the heat treatment process on the IC tag at the heat treatment process.
(4) A process for preparing the IC tag for each grinding lot or an IC tag succeeding the recorded information of the IC tag for each grinding lot with respect to each surface treatment lot and recording surface treatment information of a corresponding surface treatment lot at the surface treatment process.
(5) A process for preparing the IC tag for each surface treatment lot or an IC tag succeeding the recorded information of the IC tag for each surface treatment lot with respect to each component or each group of the same kind that is the unit of the inspection, and recording a corresponding surface treatment lot and information provided at the inspection process on the IC tag at the inspection process after the surface treatment process.
(6) Process for recording the information about rust-preventing/packaging.

An IC tag is attached to each aerospace machine element product during an assembling operation, and at least a manufacturing number is recorded on the IC tag attached to the aerospace machine element product among the manufacturing number specific to each aerospace machine element product, and the recorded information on the IC tag after the inspection process of each component of the aerospace machine element product.

The recorded information of the IC tag after the inspection process of each component of the aerospace machine element product, and inspected information of the completed aerospace machine element product is recorded in the database so as to be related to the manufacturing number.

In addition, although the process from the material purchase to the completion of the product is roughly divided into the material purchase, the forging process, the heat treatment process, the grinding process, and the surface treatment process, each process may comprise a plurality of processes and may contain the process that does not correspond to its title. For example, when the product is turned and heat treated after forged, the turning process may be contained in the forging process.

Furthermore, in the process for recording the information provided at the above forging process, the heat treatment process, the grinding process, and the surface treatment process (2) to (5), the processing condition information at the forging process, the heat treatment process, the grinding process, and the surface treatment process may be recorded.

According to this quality management method, since the history information from the material purchase of each component to the inspected contents after the aerospace machine element product has been completed is stored in the database and the manufacturing number is stored on the IC tag attached to the aerospace machine element product, the history information and the aerospace machine element product can be managed on one-to-one basis by comparing the manufacturing number to the database.

Since the information generated at each process of the component is recorded on the IC tag prepared for each lot of the process together with the lot number, detailed information can be managed.

Therefore, when a defect is generated, it is easy to exchange the defective part, specify a defective range, and cope with future improvement, so that it becomes easy to estimate the life and previously exchange the part that could cause a mechanical defective. Since the information at each process is recorded on the IC tag prepared for each lot at the process, the information can be recorded in detail as compared with the case where it is recorded on a handwriting slip. Furthermore, unlike the case where the information is inputted from the terminal to the computer, since the information is recorded on the IC tag, it is easy to recognize the IC tag by sight, so that inputting operation becomes clear and an error is not likely to be generated.

In addition, unlike the case where various kinds of information from the material purchase of the component to various process of the grinding process is all recorded in the computer, since the recorded information is stored in the IC tag, the computer can reduce its burden and the management becomes easy. Therefore, the more detailed information can be easily managed.

Furthermore, since the manufacturing number of the aerospace machine element product is recorded on the IC tag attached to the aerospace machine element product, the remaining storage region of the IC tag can be freely used for various kinds of usages after manufactured such as a shipment management, distribution management, customer management, maintenance management and the like.

According to the present invention, the IC tag prepared for each material lot, the IC tag prepared for each forging lot, the IC tag prepared for each heat treatment process, and the IC tag prepared for each surface treatment process may be attached to a container containing the plurality of materials in the same material lot, a container containing the plurality of components in the same forging lot, a container containing the plurality of components in the same heat treatment lot, and a container containing the plurality of components in the same surface treatment lot, respectively.

The IC tag may be directly attached to the container, or it may be attached to a tag attached to the container for being identified by sight. The IC tag may be detachably attached to the container. When the IC tag is attached to the container, the IC tag prepared for each lot can be always moved together with the component, so that the IC tag can be easily handled. The information can be recorded on the IC tag on a carriage path for the component.

According to the present invention, the aerospace machine element product comprises a component other than the component manufactured through the material purchase, the forging process, the heat treatment process, the grinding process, and the surface treatment process, and information about the other component may be recorded so as to be related to the manufacturing number or the lot number in the database after the aerospace machine element product has been assembled. Thus, the information about the other component is also known after the completion of the aerospace machine element product.

As the aerospace machine element product comprises the plurality of components manufactured through the material purchase, the forging process, the heat treatment process, the grinding process, and the surface treatment process and assembled, it may be a rolling bearing, for example.

In the case of the rolling bearing, the component manufactured through the material purchase, the forging process, the heat treatment process, the grinding process, and the surface treatment process comprises an inner ring, an outer ring, and a rolling element. The other component that does not go through the above processes comprises a retainer, a seal and the like.

In addition, grease may be enclosed in the aerospace machine element product at the time of assembling, and in this case, it is preferable that the assembling date of the aerospace machine element product is recorded on the IC tag attached to the aerospace machine element product. The aerospace machine element product that encloses the grease corresponds to the rolling bearing and the like.

Since the grease deteriorates over time, when its manufactured data can be known, it is easy to be managed.

According to the present invention, information about whereabouts of the aerospace machine element product from the shipment to the delivery to the customer may be recorded on the IC tag attached to the aerospace machine element product. Thus, shipment management, distribution management, customer management, maintenance management and the like can become easy.

According to the quality management method for the aerospace machine element product in the present invention, since at least one of the processing condition information and the material information in at least one of the forging process, the heat treatment process, the grinding process and the surface treatment process is recorded on the IC tag attached to the aerospace machine element product, any of the processing condition information and the material information of the forging process, the heat treatment process, the grinding process and the surface treatment process in the aerospace machine element product having the rolling element and comprising the plurality of components can be confirmed easily after delivered to the customer, so that the cause of the problem can be easily determined.

According to another quality management method for the aerospace machine element product in the present invention, since the identification information of the aerospace machine element product is further recorded on the IC tag and the database is separately prepared, more information can be easily obtained.

Still another quality management method for the aerospace machine element product according to the present invention is for the aerospace machine element product to be individually inspected, in which the IC tag is prepared for each lot at each of the processes from the material purchase to the surface treatment process of each component of the aerospace machine element product, and the lot number and the information provided at that process are recorded on the IC tag and the IC tag is attached to the aerospace machine element product in which the components are assembled. At least the manufacturing number specific to each aerospace machine element product is recorded on the IC tag, and the recorded information on the IC tag after the inspection process of the component used in the aerospace machine element product and the inspection information after the completion of the aerospace machine element product are recorded in a management computer so as to be related to the manufacturing number. Thus, the detailed information from the material purchase of the component to the inspected contents after the completion of the aerospace machine element product can be easily managed so as to be related to the aerospace machine element product on one-to-one basis.

According to still another quality management method of the aerospace machine element product in the present invention, the detailed information from the material purchase of the component to the inspected contents after the completion of the aerospace machine element product can be easily managed with respect to each manufacturing lot of the aerospace machine element product.

BRIEF DESCRIPTION OF DRAWINGS

FIG. 13 is a view showing another example of the aerospace bearing.

BEST MODE FOR CARRYING OUT THE INVENTION

The present invention is directed to quality management for an aerospace machine element product such as a rolling bearing used in an aircraft or a space appliance, and a first embodiment of the present invention will be described with reference to FIG. 1.

Figure 1:
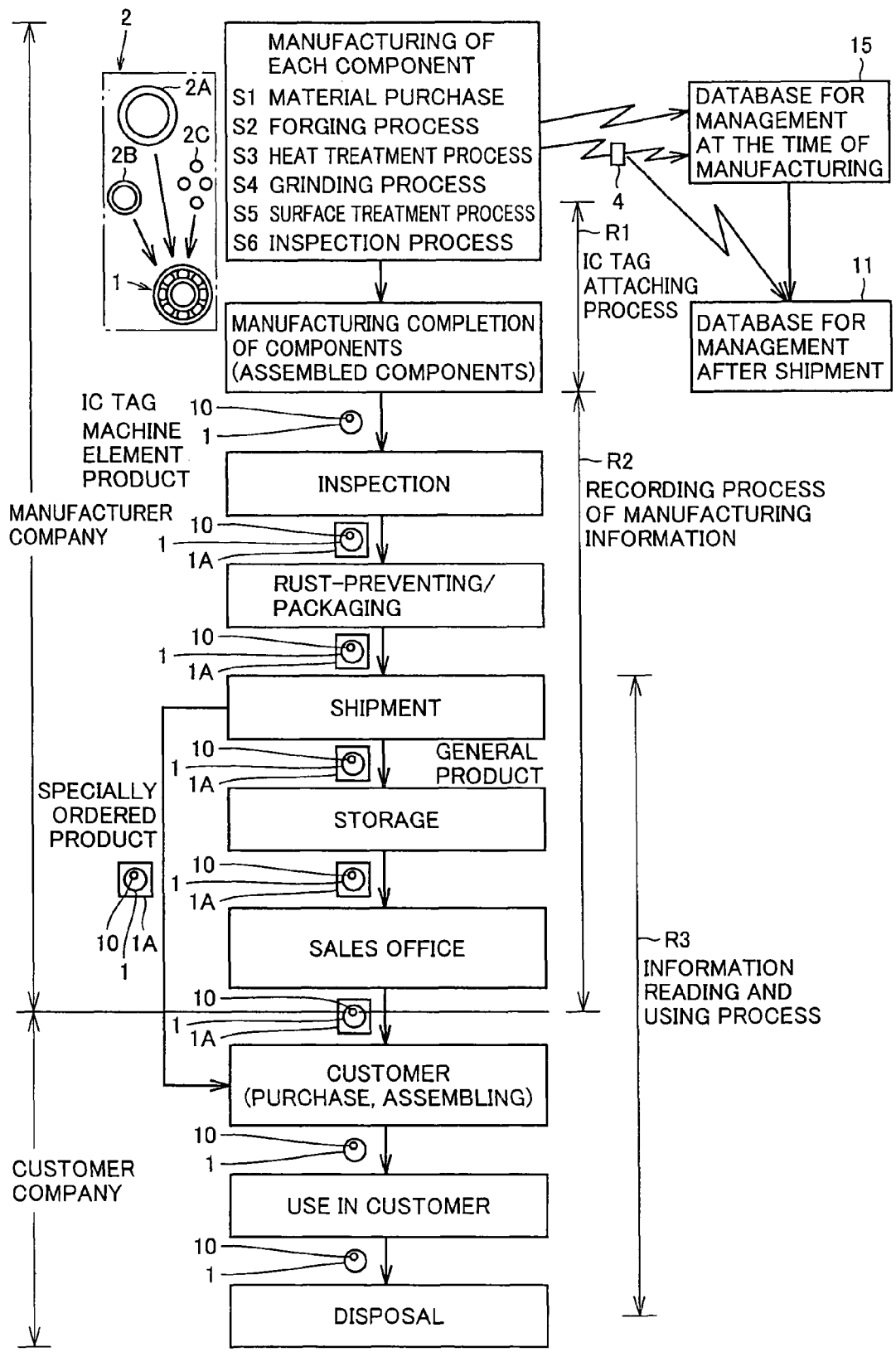
FIG. 1 is an explanatory diagram showing a quality management method of an aerospace machine element product according to a first embodiment of the present invention.

FIG. 1 shows stages from a manufacturing stage to a discarding stage of an aerospace machine element product 1, and a quality management process at each stage using an IC tag 10.

According to the quality management method of the aerospace machine element product 1, the IC tag 10 is attached to the aerospace machine element product 1. On this IC tag 10, predetermined manufacturing information about a material purchase process S1, a forging process S2, a heat treatment process S3, a grinding process S4, a surface treatment process S5, and an inspection process S6 of the aerospace machine element product 1 is recorded. Thus, the recorded information is read from the IC tag 10 to enable traceability concerning the quality management of the aerospace machine element product 1. That is, the history, application or whereabouts of the object to be considered can be traced.

According to the IC tag 10, the information can be recorded and read out without contact. The aerospace machine element product 1 to be managed comprises a plurality of kinds of assembled components 2. When the aerospace machine element product 1 is a rolling bearing, for example, the components 2 comprises an outer ring 2A, an inner ring 2B and a rolling element 2C.

The quality management method of the aerospace machine element product 1 includes an IC tag attaching process R1, a manufacturing information recording process R2 and an information reading and using process R3.

(IC Tag Attaching Process R1)

In this process, the IC tag 10 is attached to the aerospace machine element product 1 at the time of manufacturing or completion of the manufacturing of the aerospace machine element product 1. In this case, the IC tag 10 may be attached to one component 2 and then the aerospace machine element product 1 is assembled, or the IC tag 10 may be attached to the aerospace machine element product 1 after the aerospace machine element product 1 has been assembled.

(Manufacturing Information Recording Process R2)

In this process, the predetermined manufacturing information about the material purchase Si, the forging process S2, the heat treatment process S3, the grinding process S4, the surface treatment process S5, and the inspection process S6 of the aerospace machine element product 1 is recorded on the IC tag 10 attached to the aerospace machine element product 1 at the time of shipment or before delivery to a customer. This manufacturing information includes processing condition information in at least one process of the forging process S2, the heat treatment process S3, the grinding process S4, the surface treatment process S5, and the inspection process S6. The material purchase S1, the forging process S2, the heat treatment process S3, the grinding process S4, the surface treatment process S5, and the inspection process S6 regarding the aerospace machine element product 1 means the material purchase, the forging process, the heat treatment process, the grinding process, the surface treatment process, and the inspection process regarding each component 2 of the aerospace machine element product 1.

The processing condition information includes a pressing pressure, a cycle time and the like in the forging process S2, a specification number and revision letter, a heat treatment temperature, a heat treatment time, a heat treatment method and the like in the heating process S3, a grind stone rotation speed and cutting speed, a feeding speed and the like in the grinding process S4, and the kind of a surface treatment, a specification number and revision letter and the like in the surface treatment process S5. Other than the processing condition, the manufacturing information includes the name of a certified engineer in charge, a manufactured date, a manufactured place, an enclosed grease brand, the clearance between components, a quality assurance period, rust-preventing/packaging information, and handling instructions about the aerospace machine element product 1. In addition, various kinds of inspected results are also recorded as the manufacturing information.

The various kinds of inspected results include the inspected result of each component 2 and the inspected result of the manufactured product. The inspected results include the kind of nondestructive inspection, a specification number and a revision letter and the like, and the information about rust-preventing or packaging is also recorded. As the information about the rust-preventing and packaging, the kinds of rust-preventing oil and packaging or a specification number and revision letter and the like are recorded.

Moreover, other than the above manufacturing information, identification information of the aerospace machine element product 1 is recorded. The identification information of the aerospace machine element product 1 includes the part number of a customer, the revision letter in the customer drawing and/or the revision letter of an appended document such as an engineering order and the like, the name and part number of a manufacturer/serial number/the drawing number and revision letter of a delivered specification/the drawing number and revision letter of a manufacturing drawing and the like.

The manufacturing information may be recorded at one time or several times. For example, at the time of inspecting the completed product after the aerospace machine element product 1 has been assembled, the information about the inspected result and the inspection condition may be recorded and the remaining manufacturing information may be recorded later. Alternatively, all manufacturing information including the information about the inspection may be recorded at one time.

(Information Reading and Using Process R3)

In this process, the recorded information is read from the IC tag 10 and at least the processing condition information is confirmed from the readout information at any time after shipment.

As shown in FIG. 1, according to the general flow from the completion of the aerospace machine element product 1 to its disposal, the assembly of the aerospace machine element product 1 is completed, and the completed product is inspected, shipped, stored in a storage, stored in a sales office, delivered to a customer (purchased by the customer and assembled into a aircraft and the like), used and abandoned in the place of the customer. In a case of a specially ordered product, the completed product is directly delivered to the customer after the shipment. The information recorded on the IC tag 10 may be read and used at any stage after the shipment according to need, so that necessary information can be confirmed from the readout information.

For example, when the aerospace machine element product 1 becomes defective when used at the place of the customer, the various kinds of information such as the material and performance and the like about the aerospace machine element product 1 is read from the IC tag 10 attached to the aerospace machine element product 1 to specify the cause. At this time, when the recorded information comprises the processing condition information and the inspected result as well as the material information and the inspected result of each component 2, the cause can be easily specified with high accuracy.

As an additional usage of the information reading and using process R3, an available memory in the IC tag 10 attached to the aerospace machine element product 1 can be appropriately used for shipment management, inventory management, distribution management, maintenance management and the like.

According to the quality management of the aerospace machine element product 1, since the information about the forging process S2, the heat treatment process S3, the grinding process S4, the surface treatment process S5, and the inspection process S6 can be confirmed at any time after the shipment, even in the aerospace machine element product 1 comprising the plurality of components 2 having the rolling element 2C and the like and requiring strict quantity management and precision like the rolling bearing, the cause of the defect can be easily specified.

In addition, in this method, since the information can be managed with the IC tag 10 only without using a database, the processing condition information can be read without needing a communication facility and an access right to the database.

According to one embodiment, while the manufacturing information is recorded as much as possible in the IC tag 10 and the quality management is performed using the recorded information thereon, a database 11 may be used together.

More specifically, the database 11 is prepared to record the predetermined manufacturing information about the material purchase S1, the forging process S2, the heat treatment process S3, the grinding process S4, the surface treatment process S5, and the inspection process S6 of the aerospace machine element product 1 so as to be related to the identification information of the aerospace machine element product 1, and extract the recorded contents with reference to the identification information. The quality management is performed with this database 11 and the IC tag 10 attached to the aerospace machine element product 1. In this case, the following processes R1 to R3 are performed.

(IC Tag Attaching Process R1)

This process R1 is the same as that of the above embodiment.

(Manufacturing Information Recording Process R2)

In this process, the manufacturing number of the aerospace machine element product 1 as the identification information is recorded on the IC tag attached to the aerospace machine element product 1 based on the database 11 at the time of the shipment or before the delivery to the customer, and the manufacturing information about the aerospace machine element product 1 is also recorded thereon. The recorded manufacturing information includes processing condition information in at least one step of the forging process S2, the heat treatment process S3, the grinding process S4, the surface treatment process S5, and the inspection process S6.

Since the database 11 is used together, the manufacturing information to be recorded on the IC tag 10 may be limited to convenient information that can be directly read from the IC tag 10. For example, it is preferable that the manufactured date, the manufactured place, the brand of the enclosed grease, the clearance between the components, the quality assurance period, the rust-preventing/packaging information, the handling instructions and the like about the aerospace machine element product 1 are recorded in the IC tag 10.

(Information Reading and Using Process R3)

In this process, the recorded information is read from the IC tag 10 at any time after the shipment, and from the read information, or from the information provided by comparing the read identification information to the database 11, the purchased material, the manufacturing step, its processing condition information, or an inspected result and the like is confirmed. Other various kinds of data recorded on the IC tag 10 or the database 11 may be used.

According to the management method also, since the processing condition information of any of the forging process S2, the heat treatment process S3, the grinding process S4, the surface treatment process S5, and the inspection process S6 can be confirmed at any time after the shipment, even in the aerospace machine element product 1 comprising a plurality of components 2 including the rolling element 2C and the like and requiring strict quantity management and precision like the rolling bearing, the cause of the defect can be easily specified.

Furthermore, since the identification information is recorded on the IC tag 10 attached to the aerospace machine element product 1 and various kinds of information is recorded in the database 11 so as to be related to the identification information, a large amount of information can be extracted from the database 11 without depending on the limited storage capacity of the IC tag 10. Furthermore, the remaining storage capacity of the IC tag 10 can be used for management of various kinds of histories and the like after the shipment and the delivery to the customer.

The management method and database 11 will be described in detail with reference to FIG. 2 and following drawings.

In the above embodiment, the various kinds of manufacturing information to be recorded in the recording process R2 may be recorded in a database 15 for management at the time of manufacturing and then may be recorded on the IC tag 10 attached to the aerospace machine element product 1. Alternatively, an IC tag 4 for the manufacturing process may be used separately from the IC tag 10 attached to the aerospace machine element product 1.

In the method of recording the information in the database 15 for the management at the time of manufacturing, the predetermined manufacturing information about the material purchase S1, the forging process S2, the heat treatment process S3, the grinding process S4, the surface treatment process S5, and the inspection process S6 of the aerospace machine element product 1 is stored in the database 15 for the management at the time of manufacturing so as to be related to the identification number of each component 2.

The method of using the IC tag 4 for the manufacturing process is roughly as follows although the detailed description will be made below with reference to FIG. 2 and the following drawings. This method comprises a process for recording the predetermined manufacturing information about the material purchase S1, the forging process S2, the heat treatment process S3, the grinding process S4, the surface treatment process S5, and the inspection process S6 of the component 2 like the aerospace machine element product 1, on the IC tag 4 for the manufacturing process prepared for each lot number of the component 2, and a process for reading a part or a whole of the recorded information and recording it on the IC tag 10 attached to the aerospace machine element product 1. The manufacturing information recorded on the IC tag 4 for the manufacturing process is to contain processing condition information in at least one of the forging process S2, the heat treatment process S3, the grinding process S4, the surface treatment process S5, and the inspection process S6.

Figure 2:
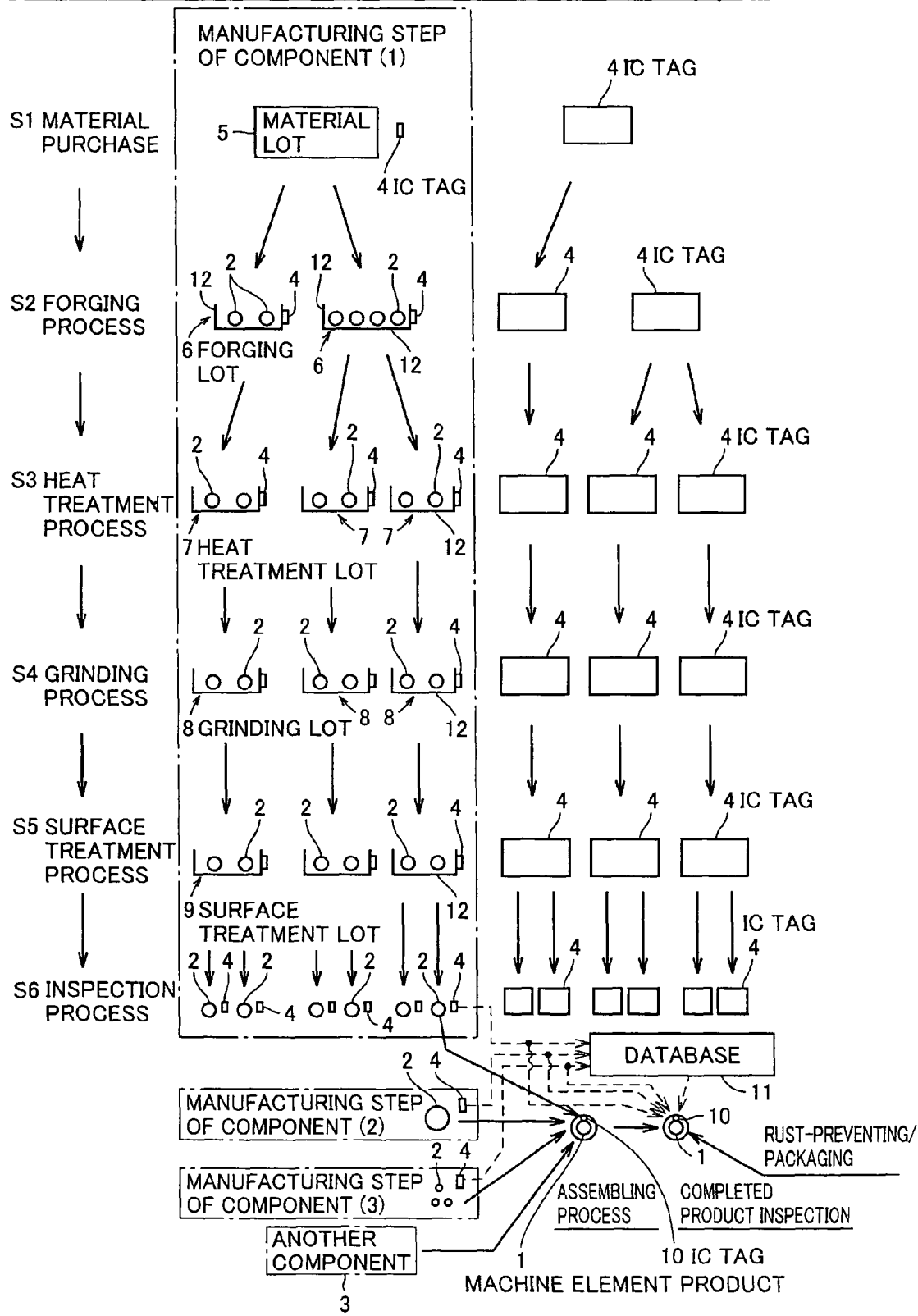
FIG. 2 is an explanatory diagram showing management of a component in a quality management method of an aerospace machine element product.

FIG. 2 is a view showing the method using the IC tag 4 for managing the aerospace machine element product according to one embodiment of the present invention.

Referring to FIG. 2, the aerospace machine element product 1 to be managed by the quality management method is provided by assembling the plurality of kinds of components 2 ((1) to (3)), and the plurality of components 2 ((1) to (3)) are manufactured through a material lot 5 at the material purchase S1, a forging lot 6 at the forging process S2, a heat treatment lot 7 at the heat treatment process S3, a grinding lot 8 at the grinding process S4, a surface treatment lot 9 at the surface treatment process S5, and the inspection process S6. The aerospace machine element product 1 corresponding to the above is a rolling bearing, for example.

Figure 11:
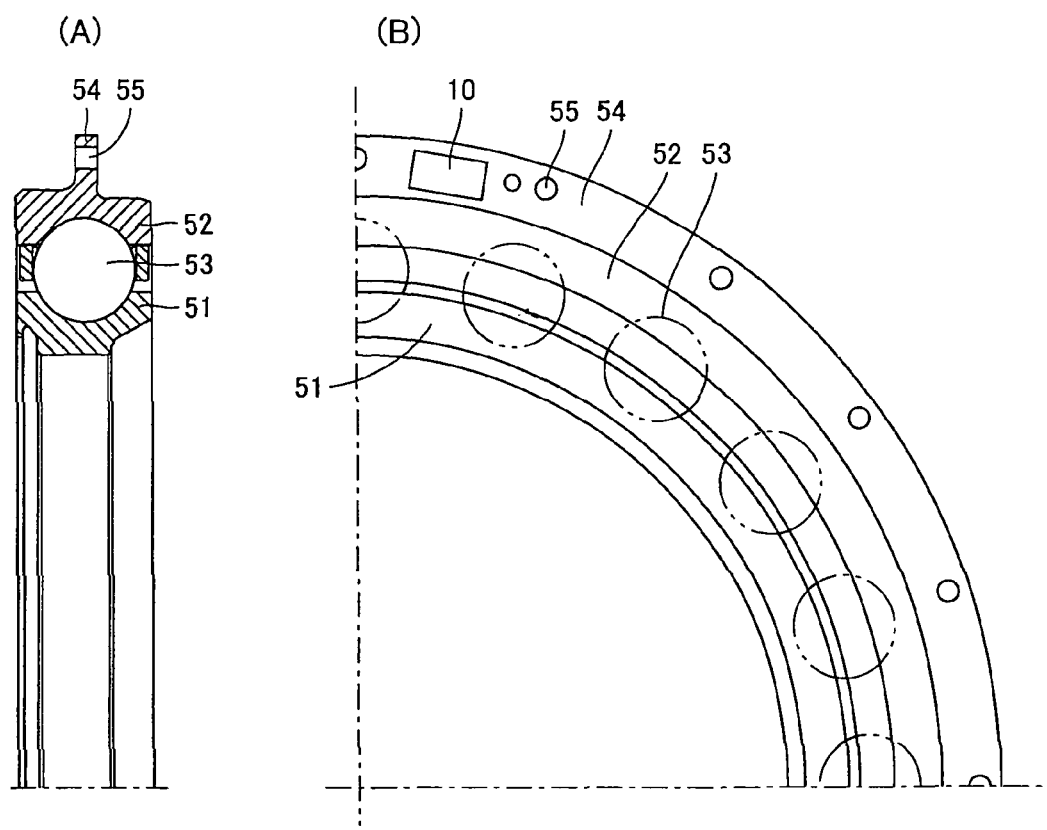
FIG. 11 is a view showing an aerospace ball bearing on which the IC tag of the present invention is attached.
Figure 12:
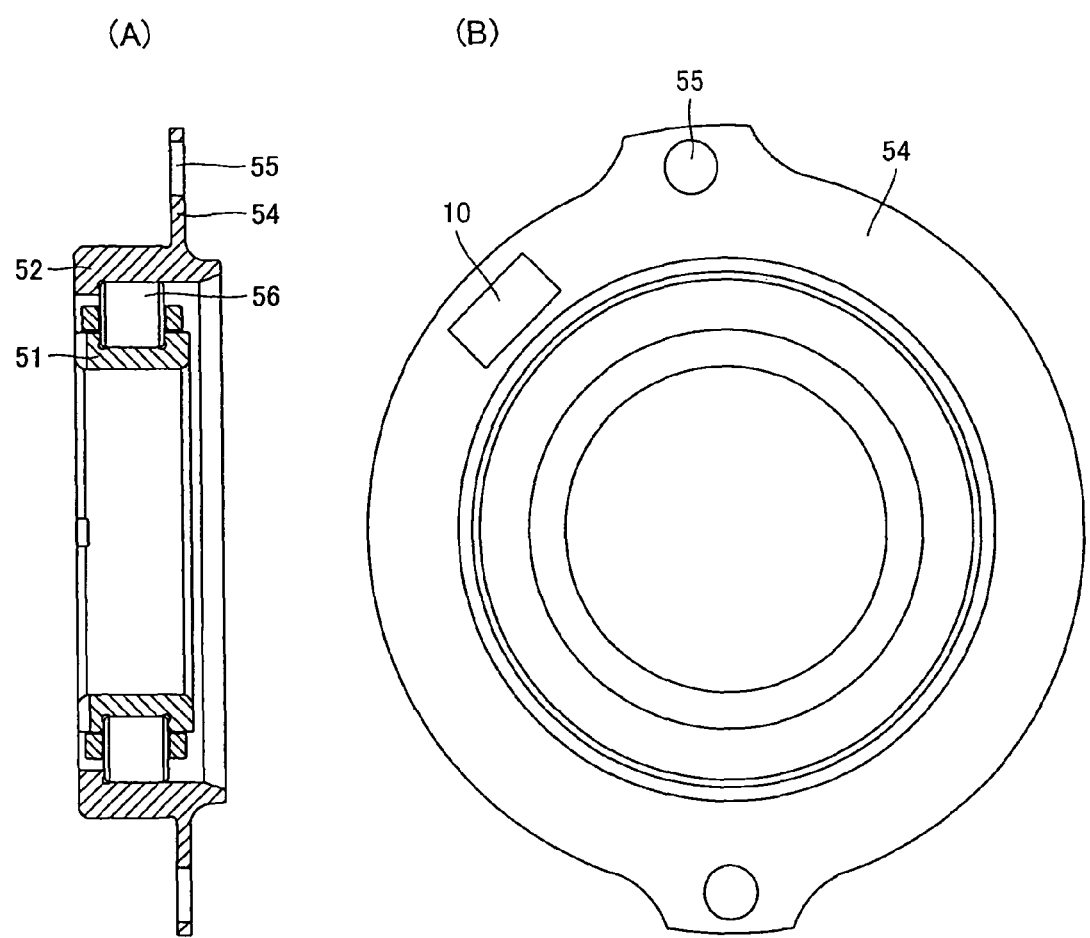
FIG. 12 is a view showing a cylindrical roller bearing according to another example of an aerospace bearing on which the IC tag is attached.

The components 2 ((1) to (3)) are the outer ring 2A, the inner ring 2B and the rolling element 2C shown in FIG. 1, for example or when the aerospace machine element product 1 is the rolling bearing as will be shown in FIGS. 11 to 13, they are an inner ring 51, an outer ring 52, and rolling elements 53 and 56. The aerospace machine element product 1 may comprise a component 3 other than the components 2 manufactured through the material purchase S1, the forging process S2, the heat treatment process S3, the grinding process S4, the surface treatment process S5, and the inspection process S6. When the aerospace machine element product 1 is the rolling bearing, a retainer (not shown) and a seal (not shown) are the above other components 3.

Figure 3:
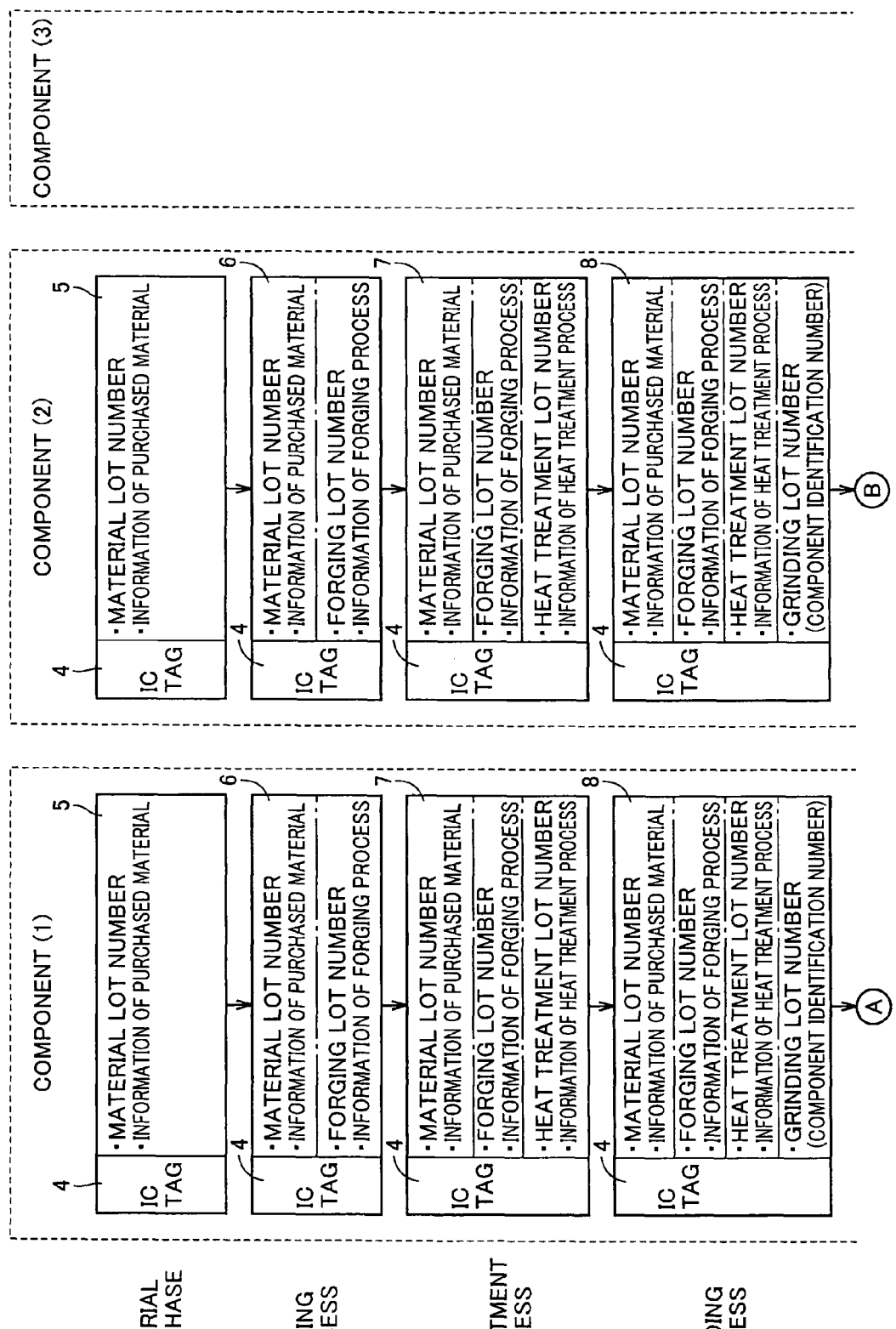
FIG. 3 is an explanatory diagram showing variations in recorded contents on each IC tag
Figure 4:
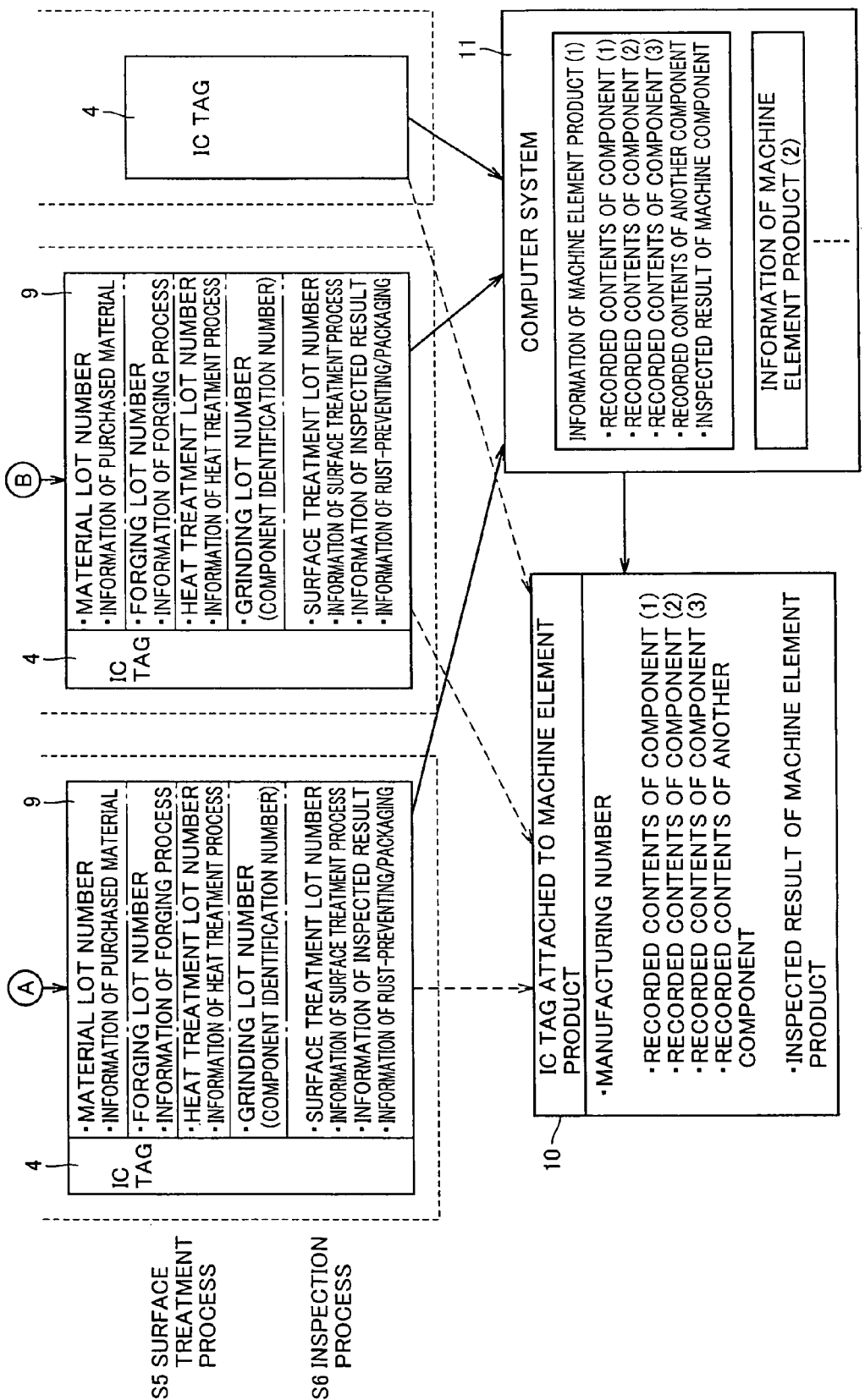
FIG. 4 is an explanatory diagram showing variations in recorded contents on each IC tag

FIGS. 3 and 4 are views showing variations in recorded contents on the IC tag. These sections are roughly divided into the material purchase to the completion of the component. Each process may comprise a plurality of processes and may contain a process not corresponding to the title of the process. The title of each of the processes S1 to S6 is the title of the representative process.

This management method comprises the following processes (1) to (5) with respect to each of the components 2 ((1) to (3)) shown in FIG. 2, and comprises processes as will be described below with respect to the aerospace machine element product 1 provided by assembling the components 2. In addition, although the lots at the process may be separated in the downstream of the manufacturing processes, they are not to be combined.

(1) Management Process at Material Purchase S1

When the material of the component 2 is purchased, a process lot number of material of the corresponding material lot 5, and information about a material specification number and a revision letter are recorded on an IC tag 4 prepared individually for the material lot 5.

(2) Management Process at Forging Process S2

The IC tag 4 for the material lot 5 or an IC tag 4 succeeding the recorded information on the IC tag 4 for the material lot 5 is individually prepared for the forging lot 6 and a forging lot number of the corresponding forging lot 6 and information provided at the forging process is recorded on the IC tag 4.

(3) Management Process at Heat Treatment Process S3

The IC tag 4 for the forging lot 6 or an IC tag 4 succeeding the recorded information on the IC tag 4 for the forging lot 6 is prepared individually for a heat treatment lot 7 and a specification number and a revision letter and a heat treatment lot number about the corresponding heat treatment lot 7 and information provided at the heat treatment process are recorded on the IC tag 4.

(4) Management Process at Grinding Process S4

The IC tag 4 for the heat treatment lot 7 or an IC tag 4 succeeding the recorded information on the IC tag 4 for the heat treatment lot 7 is prepared individually for the grinding lot 8 and the processing condition about the corresponding grinding lot 8 is recorded on the IC tag 4.

(5) Management Process at Surface Treatment Process S5 and at Subsequent Inspection Process S6

The IC tag 4 for the grinding lot 8 or an IC tag 4 succeeding the recorded information on the IC tag 4 for the grinding lot 8 is prepared individually for the surface treatment lot 9 and information on the kind of the surface treatment, a specification number and revision letter about the corresponding surface treatment lot 9 are recorded on the IC tag 4.

Furthermore, the IC tag 4 for the surface treatment lot 9 or an IC tag 4 succeeding the recorded information on the IC tag 4 for the surface treatment lot 9 is prepared for each component 2 or each group of the same kinds of components that becomes the unit of the inspection, and information provided at the corresponding inspection process and information regarding rust-preventing and packaging are recorded on this IC tag 4.

The IC tag 10 to be used after completion is attached to each aerospace machine element product 1 in which the components 2 ((1) to (3)) are assembled during the assembly, and among the manufacturing number specific to each aerospace machine element products 1 and recorded information on the IC tag 4 after the inspection process of the components 2 ((1) to (3)) used in the aerospace machine element product 1, at least the manufacturing number is recorded on the IC tag 10 attached to the aerospace machine element product 1. In the database 11, the recorded information on the IC tag 4 after the inspection process of the components 2 ((1) to (3)) used in the aerospace machine element product 1, the inspected information after the completion of the aerospace machine element product 1 and the information regarding the packaging are recorded so as to be related to the manufacturing number.

The IC tag 4 used at the processes S1 to S5 may be the same through the all processes or different IC tags 4 may be used at each process and the recorded information of the IC tag 4 at the previous process may be transferred. In the case where the lots are separated at the downstream process, a new IC tag 4 may be prepared and the recorded information at the previous process may be transferred to it, or IC tags 4 may be prepared by the number of separated lots and the information may be additionally recorded on the same IC tag 4 through all processes.

Through the processes S1 to S5, each lot number and the information at each process recorded on the IC tag 4 are added every process as shown in FIGS. 3 and 4.

Figure 5:
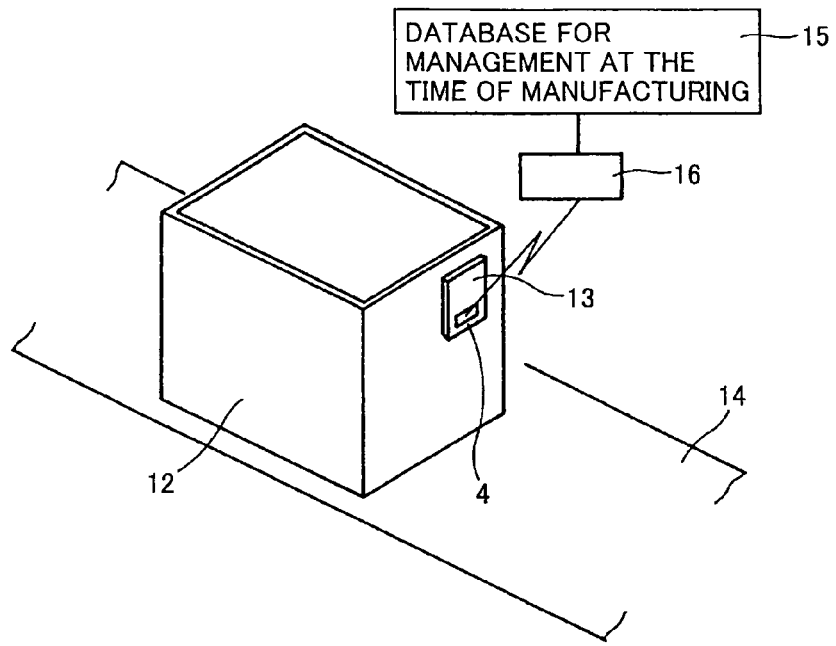
FIG. 5 is an explanatory diagram showing a container of the component and a concept of a writing configuration to an IC tag thereof.

FIG. 5 is an explanatory diagram showing a container of the component and the concept of a writing configuration to the IC tag 4.

At each process, the IC tag 4 is attached to a container 12 containing the component 2 for carriage as shown in FIG. 2, for example. The container 12 is a basket, a box or a pallet, for example. In this case, the IC tag 4 may be directly attached to the container 12, or it may be attached to a tag 13 attached to the container, for being identified by sight as shown in FIG. 5. The IC tag 4 may be detachable attached to the container 12. When the IC tag 4 is attached to the container 12, the IC tag 4 prepared for each lot can be always moved together with the component 2, so that the IC tag 4 can be easily handled. In addition, the information can be recorded on the IC tag 4 on a carriage path 14 such as a conveyor for the component 2.

The above each management process will be described in detail.

(1) Management Process at Material Purchase S1

The material is purchased in the configuration of a steel block, a copper plate, a steel pipe, a steel wire and the like. Various kinds of quality inspections are conducted for the purchased material. In this management process, the information about the purchased material to be recorded on the IC tag 4 is divided into source information and quality information. The source information includes a company name of the distributor of the material, and the factory address of the company. The quality information includes information about steel hardness and nonmetallic inclusion. As the quality information, the result of the inspection of the material after purchased may be recorded, or the information from the distributor may be recorded, or both may be recorded. According to the recording method of the information to the IC tag 4 in this process, the information provided from a purchase management computer (not shown) and the like is recorded through a recording terminal.

(2) Management Process at Forging Process S2

There exists various kinds of forging processes S2 depending on the kind of the aerospace machine element product 1 and the kind of the component 2.

Figure 7:
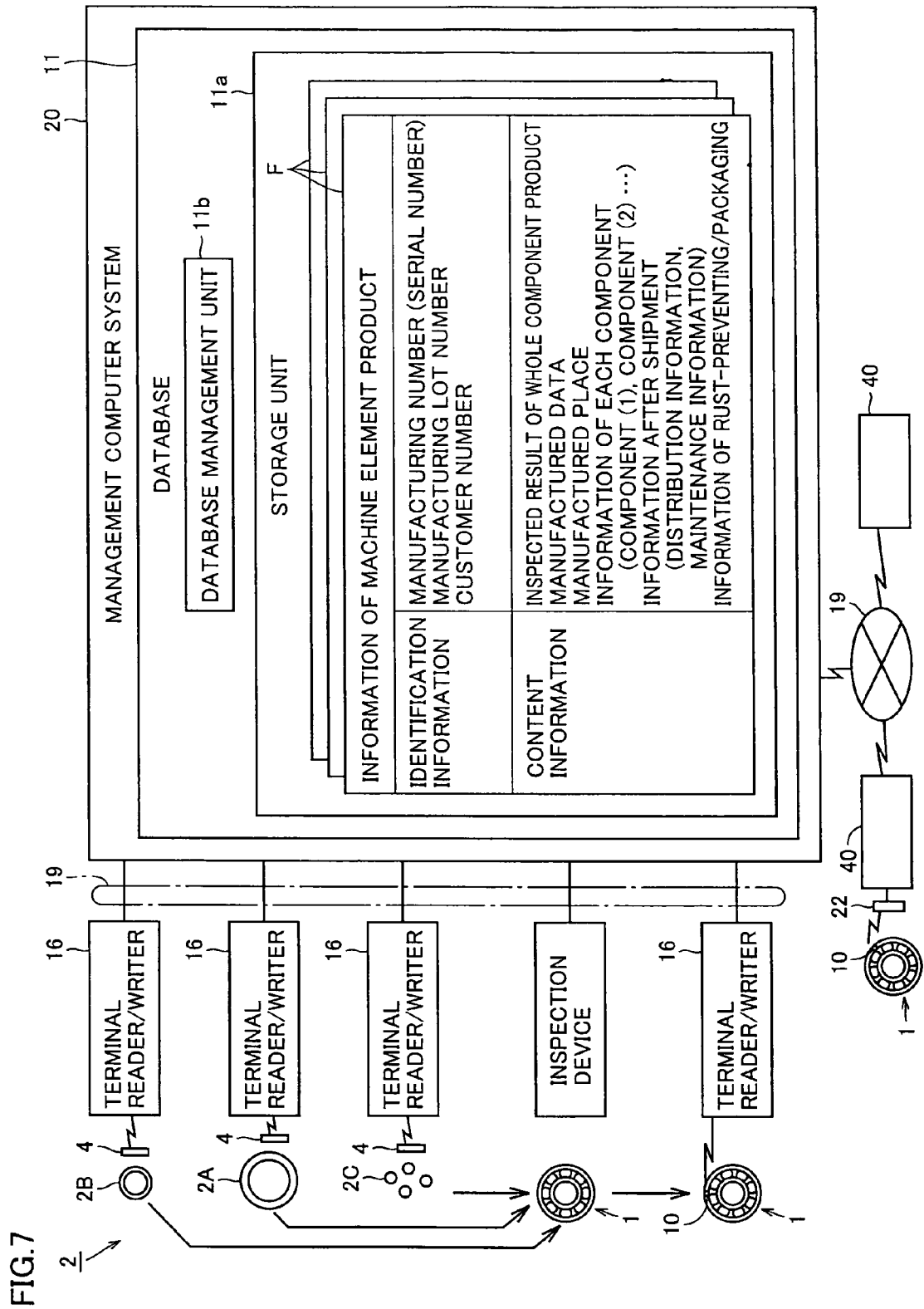
FIG. 7 is an explanatory diagram showing the relation between database and the IC tag.
Figure 8:
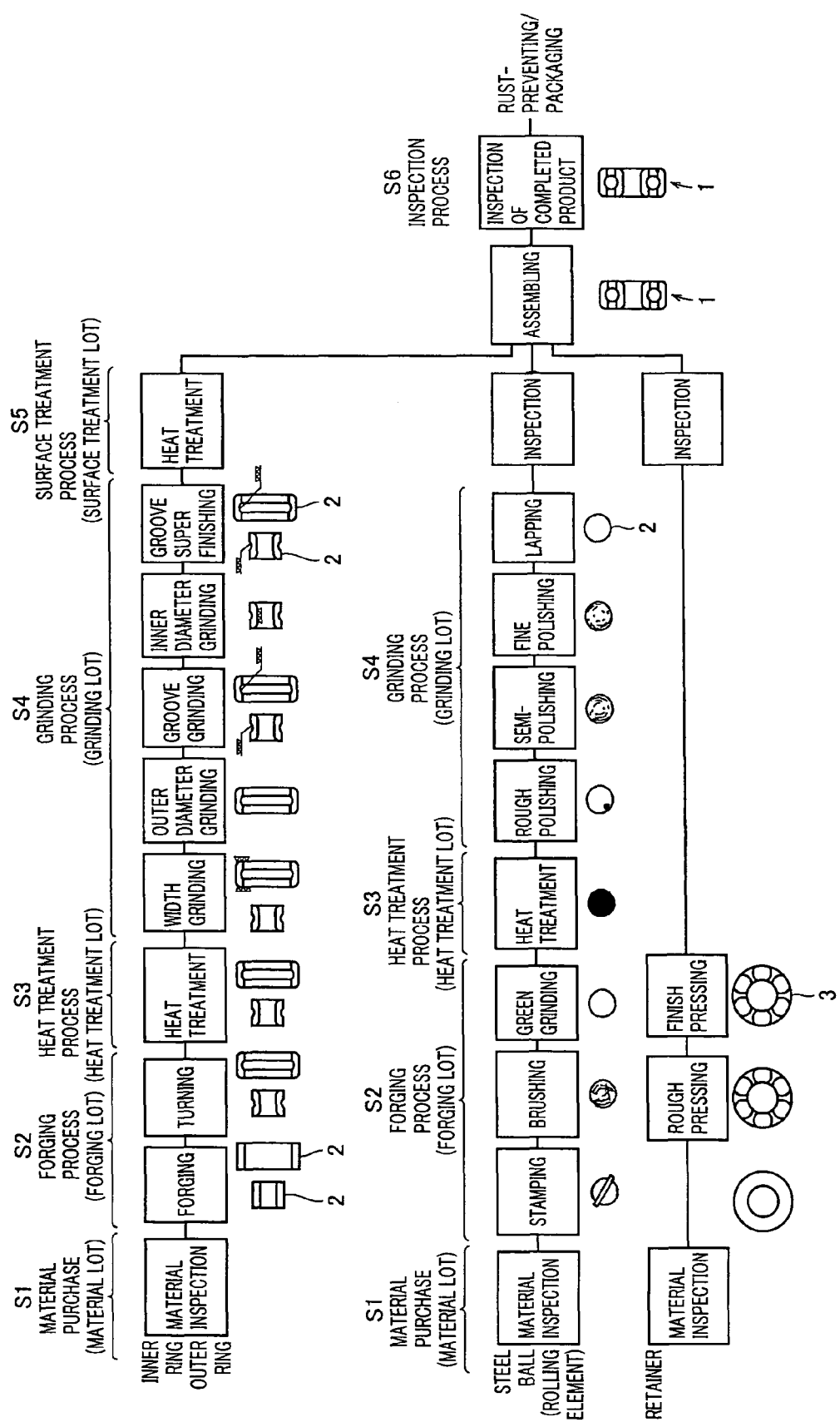
FIG. 8 is an explanatory diagram showing an assembly constitution of the aerospace machine element product.

FIG. 7 is a view for explaining the concept of the recording configuration on the IC tag, from the surface treatment process to the inspection process during the manufacturing process of the component, and FIG. 8 is a view for explaining the concept of the recording configuration on the IC tag, from the surface treatment process to the inspection process during the manufacturing process of the component.

According to the component 2 to be the inner ring 2B or the outer ring 2A, the forging process S2 comprises a forging process to form the rough configuration of the inner ring 2B or the outer ring 2A, and a process to turn the forged product. In the case where the component becomes the rolling element 2C such as a steel ball, the forging process S2 comprises processes of stamping, brushing, green grinding (grinding of unhardened element).

The information may be recorded on the IC tag 4 at the forging process S2 at one time or may be recorded at each process in the forging process S2. For example, when the component 2 is the inner ring 2B or the outer ring 2A of the rolling bearing, and it is forged and turned as shown in FIG. 8, information about the width dimension, inner diameter dimension, groove dimension, chamfered dimension and the like measured after the turning process is recorded on the IC tag 4. When the component 2 is the rolling element 2C and processed through the processes shown in FIG. 8, information about the dimension, strain, appearance and the like is recorded after stamping process and information about the dimension, sphericity, appearance and the like measured after the brushing and green grinding processes is recorded. In addition, the processing condition information is also recorded.

According to the recording method of the information onto the IC tag 4 in this process, the information is recorded from the database 15 for the management at the time of manufacturing, that is, for process management or for inspection management used at each process of the forging process S2, through a terminal 16. When it is necessary to input the information by an operator, the information is inputted from input means 17 such as a keyboard and recorded through the database 15 for the management at the time of manufacturing, or directly from the terminal 15 as shown in FIG. 6.

Figure 6:
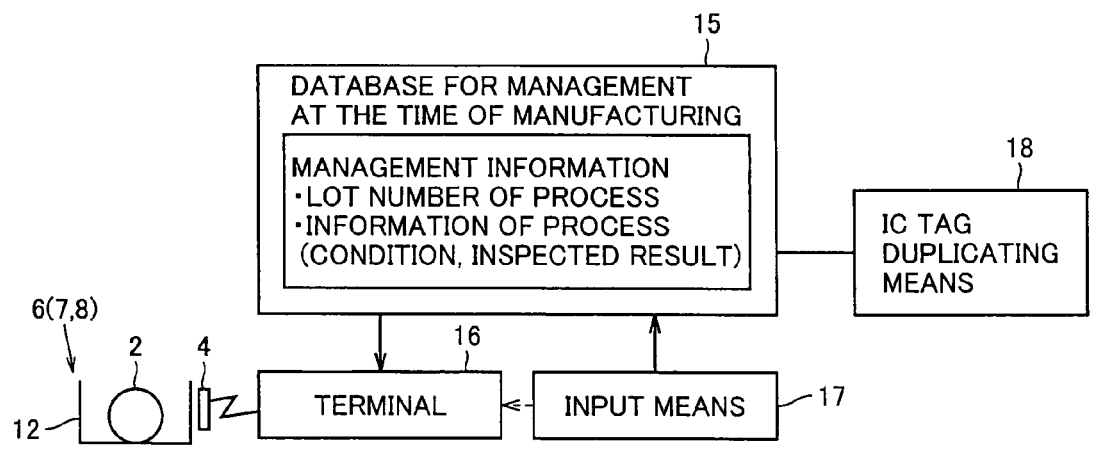
FIG. 6 is an explanatory diagram showing a concept of a recording configuration from a surface treatment process to an inspection process onto the IC tag while the component is manufactured.

When the number of the forging lots 6 is more than that of the previous-process material lot 5, a new IC tag 4 is prepared and the recorded information on the IC tag 4 for the material lot 5 is transferred by IC tag duplicating means 18 shown in FIG. 6, and the information of the forging process S2 is recorded on the IC tag 4 that succeeded the transferred information. When the number of lots is increased in the following processes also, the previous information is transferred to a new IC tag 4 similarly.

(3) Management Process of Heat Treatment Process S3

The inspection is conducted after the heat treatment. When the component 2 is the inner ring 2B or the outer ring 2A of the rolling bearing, its hardness, deformation, composition and the like are inspected. The inspected results are recorded as the information of the heat treatment process S3. In addition, the heat treatment condition and the like may be recorded also.

(4) Management Process at Grinding Process S4 and Following Inspection Process

The grinding process S4 takes various kinds of configuration depending on the kind of the aerospace machine element product 1 and the kind of the component 2. When the component 2 is the inner ring 2B or the outer ring 2A of the rolling bearing, at the grinding process S4, width grinding, outer diameter grinding, groove grinding, inner diameter grinding, and groove super-finishing are performed as shown in FIG. 8. When the component 2 is the rolling element 2C of the rolling bearing, rough polishing, semi-polishing, fine polishing, and lapping are performed. At each process, the completed product at the process is inspected. The information recorded on the IC tag 4 includes the processing condition at each process in the grinding process S4. The information of the processing condition is the kind of the grind stone, processing speed and the like.

After the grinding process, the inspection is conducted and the result thereof is recorded on the IC tag 4. The information of the inspected result includes various kinds of dimensions. For example, in the case of the width grinding of the inner or outer ring, the dimension, width dimension, appearance and the like are recorded, and in the case of the outer diameter grinding of the outer ring, the outer diameter dimension, roundness, cylindricity, appearance and the like are recorded. In the case of the groove grinding of the inner or outer ring, the dimension, roundness, radial deflection, axial deflection, groove center difference of the ground object and the like are recorded. In the case of the inner diameter grinding of the inner ring, the inner diameter dimension, roundness and the like are recorded. In the case of the groove super-finishing of the inner or outer ring, the dimension, appearance and the like are recorded. When the component 2 is the rolling element 2C, the above recorded information includes the dimension, roundness of the inspected result after the rough grinding and other processes in the grinding process S4, and the appearance, dimension, sphericity, mutual difference of diameter, hardness, sound, and microscopic inspected result of the inspected result of the component 2 in the completed state as the completed product at the grinding process S4.

(5) Management Process at Surface Treatment Process S5 and Following Inspection Process When the component 2 is the inner ring 2B or the outer ring 2A of the rolling bearing, a film is formed on the surface by a predetermined surface treatment method.

At the surface treatment process S5, one hundred percent inspection is conducted because of the specially ordered product. In the case of the one hundred percent inspection, the IC tag 4 is prepared by the number of the components 2, and the grinding lot number of the corresponding component 2, information about inspected result and the like are recorded on the IC tag 4. In addition to the grinding lot number, a number for identifying each component 2 may be additionally recorded. When many components 2 are used in one aerospace machine element product 1 like the rolling elements 2C in the rolling bearing, a group of the components 2 used in one aerospace machine element product 1 or a group of the components 2 used in the same place (each row in the case of a double row bearing, for example) of the one aerospace machine element product 1 is regarded as one component 2 and one IC tag 4 is prepared for it, and the information may be recorded with respect to each group.

(6) Assembly of Aerospace Machine Element Product and Management Process at Following Process Each component 2 manufactured as described above is assembled to one aerospace machine element product 1 at an assembling process. The IC tag 10 is attached to the aerospace machine element product 1 during the assembly operation. That is, the IC tag 10 may be attached to the component 2 or may be attached to the completed product. In addition, the IC tag may be attached to the inside or surface of the aerospace machine element product 1. The IC tag 10 attached to the aerospace machine element product 1 has to be small so as not to hinder the function and handling of the aerospace machine element product 1. The practically used IC tag has the size less than 1 mm, and this dimension may be employed, for example.

After the aerospace machine element product 1 has been assembled, various kinds of inspections are conducted for the completed product. Although these inspections are conducted after the IC tag 10 has been attached, it may be conducted before the IC tag 10 is attached depending on an attachment configuration. When the aerospace machine element product 1 is the rolling bearing, factors such as the inner diameter, outer diameter, width dimension, roundness, cylindricity, radial fluctuation, axial fluctuation, rolling, clearance, sound and the like are inspected. When the completed product is individually inspected in the case of the specially ordered product, for example, all aerospace machine element products 1 are individually inspected.

As shown in FIG. 2, the information of each component 2 that constitutes the aerospace machine element product 1 on the IC tag 4 is recorded in the database 11 so as to be related to the manufacturing number while the aerospace machine element product 1 is assembled. In addition, the inspected result of the completed product is also recorded so as to be related to the manufacturing number. The manufacturing number is specific to each aerospace machine element product 1, which is a serial number, for example. When the aerospace machine element product 1 comprises another component (retainer, for example) 3 that is not processed through the above processes, the information of the other component 3 is also recorded in the database 11.

At least above manufacturing number is recorded on the IC tag 10 attached to the aerospace machine element product 1 as described above. On this IC tag 10, the recorded information on the IC tag 4 of each component 2, the inspected result of the completed product may be recorded other than the manufacturing number. When the inspected result of the completed product is recorded on the IC tag 10 attached to the aerospace machine element product 1, the inspected result may be recorded on the IC tag 10 at the inspection process and the information may be transferred from the IC tag 10 to the database 11. Moreover, the IC tag 10 may be attached to a package 1A (FIG. 1) of the aerospace machine element product 1 in addition to the aerospace machine element product 1 and the manufacturing number and the like may be recorded thereon.

As shown in FIG. 7, the database 11 is provided in a management computer system 20 provided in a computer network 19. The above recorded information F about the aerospace machine element product 1 is recorded in a storage unit 11a of the database 11. The computer network 19 is a wide area network such as the internet or a wide area network to which a local area network is connected. The database 11 comprises the storage unit 11a and a database management unit 11b that manages the input/output or search of the storage unit 11a.

The database 11 may be the group of physically divided databases or may share the information with another kind of database as long as it can be recognized as one database for quality management conceptually. For example, the database 11 may comprise a plurality of computers provided separately in the computer network 19 or may share the recorded information with the database 15 for the management at the time of manufacturing or a database for technique information management and the like.

The database 11 is connected to an information processing device 40 and a portable terminal in a technical section, storage, sales office, a business office of a customer company other than an information processing device in a factory in which the aerospace machine element product 1 is manufactured.

According to this quality management method, history information from material purchase of each of the components 2 including the inner ring 2B, the outer ring 2A and rolling element 2C to the inspected result of the completed aerospace machine element product 1 is stored in the management computer system 20 and the manufacturing numbers are recorded on the IC tag 10 attached to the aerospace machine element product 1. Thus, when the manufacturing number is compared to the management computer system 20, the above history information can be managed so as to be related to the aerospace machine element product 1 on one-to-one basis. For example, a user of the aerospace machine element product 1 or a person who provides a maintenance service can know the history information of the aerospace machine element product 1 at any stage after the shipment.

Since the information generated at each manufacturing process of the component 2 of the aerospace machine element product 1 is recorded with the lot number on the IC tag 4 prepared with respect to each lot in each process, the history information can be managed in detail. Therefore, when a defect is generated, it is easy to exchange the defective part, specify a defective range, and cope with future improvement, so that it becomes easy to determine the life and previously exchange the part that could cause a mechanical defective.

Since the information at each process is recorded on the IC tag 4 prepared for each lot at the process, the information can be recorded in detail as compared with the case where it is recorded on a handwriting slip. Furthermore, unlike the case where the information is inputted from the terminal to the computer, since the information is recorded on the IC tag 4, it is easy to recognize the IC tag 4 by sight, so that inputting operation becomes easy and an error is not likely to be generated.

In addition, unlike the case where various kinds of information about the material purchase of the component 2 and various processes at the grinding process is all recorded in the computer, since the information is recorded on the IC tag 4 at the manufacturing process, the computer can reduce its burden and the management becomes easy. Therefore, the more detailed information can be easily managed.

Furthermore, since the manufacturing number of the aerospace machine element product 1 is recorded on the IC tag 10 attached to the aerospace machine element product 1, the remaining storage region of the IC tag 10 can be freely used for various kinds of usages after manufactured such as a shipment management, distribution management, customer management, maintenance management and the like.

More specifically, the aerospace machine element product 1 is sent to the storage and delivered from the sales office to the customer after it has been assembled, inspected and shipped in general as described above with reference to FIG. 1. In the case of the specially ordered product, it is directly delivered to the customer after the shipment in some cases. On the customer side, the aerospace machine element product 1 is incorporated in an equipment to be used and it is abandoned after an endurance time and the like. In this each process, in addition to knowing the history information by reading the manufacturing number from the IC tag 10 attached to the aerospace machine element product 1, various kinds of usages can be employed using the remaining storage region of the IC tag 10.

Figure 9:
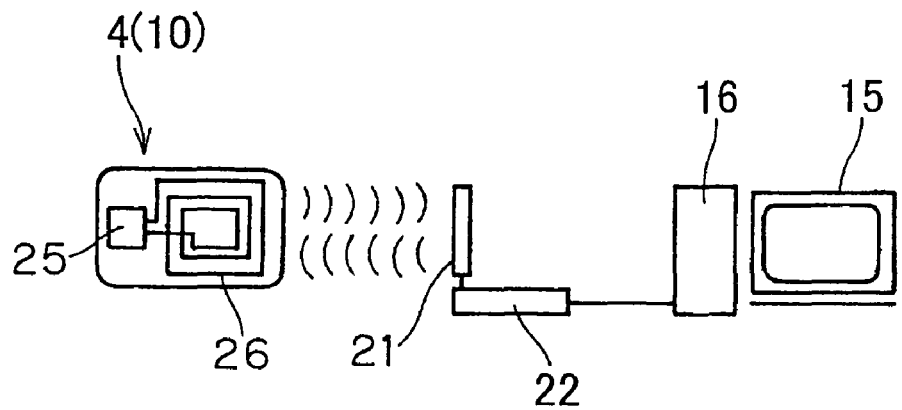
FIG. 9 is an explanatory diagram showing the relation between the IC tag and a tag reader/writer.

FIG. 9 shows an explanatory diagram showing the relation between the IC tag and a tag reader/writer.

Next, a description will be made of the IC tag 4 (10) used in the above each management method with reference to FIG. 9. The information is recorded and read to and from the IC tag 4 (10) by an IC tag reader/writer 20. The IC tag reader/writer 20 has an antenna 21 to be opposed to the IC tags 4 (10). The IC tag 4 (10) comprises an IC chip (chip of an integrated circuit) 25 and an antenna 26, in which the information can be recorded and read without contact. These IC chip 25 and the antenna 26 are integrally surrounded by a resin (not shown).

As the IC tag has various kinds of types, configurations and sizes such as a plated shape, an angular or spherical shape having the size less than 1 mm and has various kinds of storage capacities, it may be appropriately selected according to the size or kind of the object on which the IC tag is mounted.

Since the IC tag 4 used in the management of the component 2 is attached to the container 12, it can be relatively large. Meanwhile, the IC tag 10 attached to the aerospace machine element product 1 is preferably small. As the IC tag 4 (10), a RFID (Radio Frequency Identification) tag based on a RFID technique can be used. According to the FRID type of IC tag, it uses electrostatic coupling, electromagnetic coupling, electromagnetic induction, microwave, light and the like as transmitting means, and the electromagnetic induction is used, for example although any one of them may be used. In addition, some IC tag can be used even when a metal exists in the periphery, which is preferable when it is attached to the aerospace machine element product 1.

Figure 10:
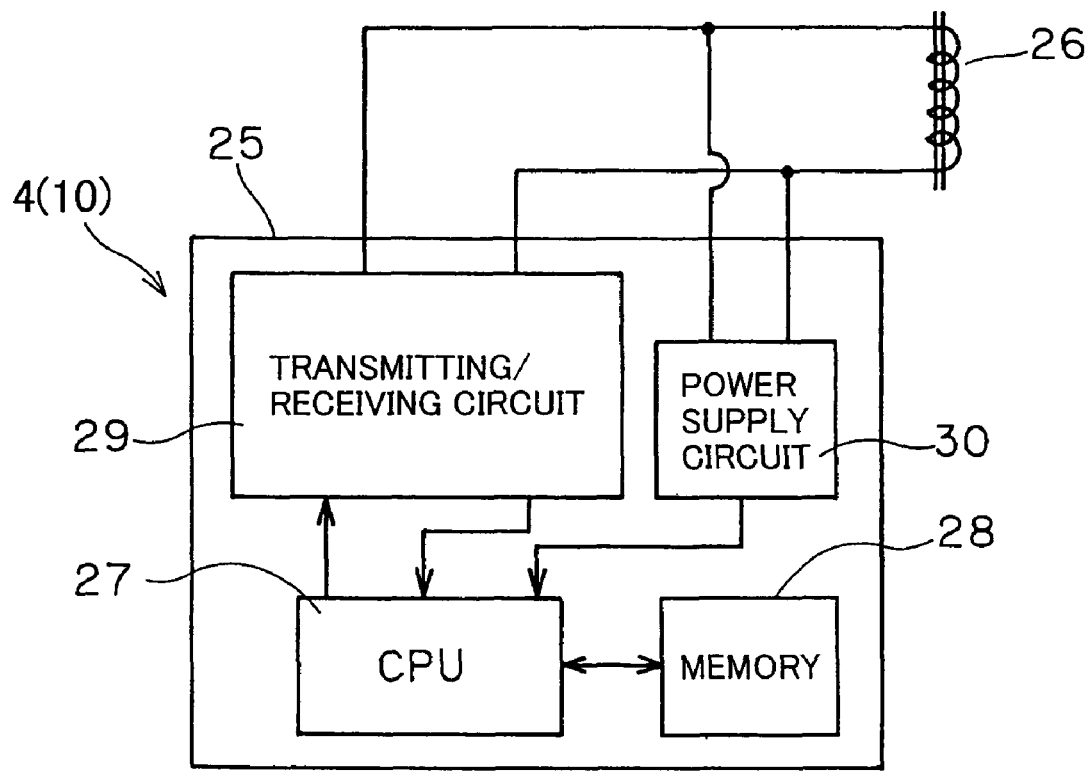
FIG. 10 is a circuit diagram showing the IC tag.

FIG. 10 shows a specific circuit example of the IC tag 4 (10). The IC tag 4 (10) comprises a central processing unit (CPU) 27, a memory 28, a transmitting/receiving circuit 29, and a power supply circuit 30, and the power supply circuit 30 obtains a power source from a high-frequency signal supplied from the antenna 26. As the memory 28, a nonvolatile memory that does not require a power supply in storing the information is used, and the information is exchanged with the IC tag reader/writer 20 with the transmitting/receiving circuit 29 through the antenna 26.

In addition, although the description has been made of the case where the aerospace machine element product 1 is the rolling bearing in the above embodiment, the management method in the present invention can be applied to any aerospace machine element product 1 that comprises a plurality of components 2 manufactured through the material purchase, forging process, heat treatment process, grinding process, and surface treatment process and assembled.

FIG. 11 is a view showing an aerospace ball bearing as one example of the aerospace machine element product to which the IC tag of the present invention is attached, in which FIG. 11(A) is a partially sectional view and FIG. 11(B) is a plan view showing an essential part. Balls 53 are provided between an inner ring 51 and an outer ring 52 as rolling elements, and a ring-shaped flange 54 is provided around the outer peripheral surface of the outer ring 52. Mounting holes 55 are formed in the flange 54. These mounting holes 55 are formed so that the bearing can be accurately positioned and mounted on an engine of an aircraft and the like.

The IC tag 10 is buried in a mounting hole (not shown) formed in the flange 54 and molded with a resin and the like. The bearing shown in FIG. 11 is provided at a place in which a load is not applied in the axial direction so much, so that the thickness of the flange 54 is relatively thinly formed.

The IC tag 10 is attached to the outer ring 52 after the grinding process S4 of the outer ring 52, for example without any other component. In addition, the IC tag 10 may be attached to the inner ring or a retainer (not shown) or a seal (not shown) instead of being attached to the flange 54.

FIG. 12 shows a cylindrical roller bearing according to another example of the aerospace bearing to which the IC tag is attached, in which FIG. 12(A) is a partially sectional view and FIG. 12 (B) is a plan view showing an essential part. Referring to FIG. 12, cylindrical rollers 56 are provided between an inner ring 51 and an outer ring 52 as rolling elements, in which a ring-shaped wide flange 54 is formed around the outer ring 52 and mounting holes 55 are formed at two positions. The IC tag 10 is attached to the flange 54. In addition, the cylindrical roller bearing shown in FIG. 12 is also provided in a place where the load is not applied in the axial direction so much, so that the thickness of the flange 54 is relatively thinly formed.

FIG. 13 is a view showing a bearing according to another example of the aerospace bearing to which the IC tag is attached, in which FIG. 13(A) is a sectional view showing a ball bearing and FIG. 13(B) is a sectional view showing a cylindrical roller bearing.

The ball bearing in FIG. 13(A) comprises an inner ring 51, an outer ring 52, and balls 53, and the inner ring 51 comprises a pullout part 57. This pullout part 57 comprises a groove in which a tool fit to remove the bearing after mounted on an engine of an aircraft and the like. The IC tag 10 is attached to the pullout part 57.

The bearing shown in FIG. 13(B) comprises cylindrical rollers 56 between an inner ring 51 and an outer ring 52 as rolling elements and the inner ring 51 comprises a pullout part 57 and the IC tag 10 is attached to the pullout part 57.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The quality management method of the aerospace machine element product according to the present invention can be applied to quality management for a rolling bearing used in an aircraft including a flying object such as a fixed wing, a rotating wing and missile or a space appliance including a rocket, a rocket engine and an artificial satellite.

The invention claimed is:

1. A quality management method of managing a roller bearing for aerospace equipment, said bearing having an inner ring, an outer ring, and a rolling element arranged between said inner and outer rings, comprising:

a database storing specific information of any of information about a customer including various kinds of history management after a shipment and after a delivery, said information about a request from a customer, and said information about a manufacturer, and storing predetermined processing condition information and material information about material purchase, a forging process, a heat treatment process, a grinding process, and a surface treatment process of said inner ring, said outer ring, and said rolling element so as to be related to identification information, said database being connected to various information processing devices located in a manufacturing factory, storage, and sales offices via a manufacturing side network and to information processing devices and portable terminals located in a customer company via a customer side network:

said method comprising:

a process for attaching an IC tag to either one of said inner ring and said outer ring of said roller bearing at the time of the manufacturing or at the time of completion of the manufacturing of said roller bearing;

a process for recording specific information including any of information about a customer, information about a request from the customer, and information about a manufacturer, and recording any of processing condition information and material information on at least one process of the forging process, the heat treatment process, the grinding process and the surface treatment process of said inner ring, said outer ring, and said rolling element, said specific information being recorded individually for said inner ring, said outer ring, and said rolling element on the IC tag attached to either one of said inner ring or said outer ring of said roller bearing; and an information reading and using process for reading the recorded information on said IC tag and confirming any of said specific information, said processing condition information, and material information, from the read information at any time after shipment at both said manufacturing side and said customer company.

2. The quality management method of managing a rolling bearing for aerospace equipment, said bearing having an inner ring, an outer ring, and a rolling element arranged between said inner and outer rings, according to claim 1, further comprising:

a process for recording the predetermined manufacturing information about the material purchase, the forging process, the heat treatment process, the grinding process and the surface treatment process of said component of said aerospace machine element product, on an IC tag for a manufacturing process, prepared for each lot number of said component at each process; and a process for reading the information recorded on said IC tag for the manufacturing process and recording a part or all of the read information on the IC tag attached to said aerospace machine element product, wherein the manufacturing information recorded on said IC tag for the manufacturing process includes at least one of processing condition information and material information in at least one of the forging process, the heat treatment process, the grinding process, and surface treatment process.

3. The quality management method of a rolling bearing for aerospace equipment, said bearing having an inner ring, an outer ring, and a rolling element arranged between said inner and outer rings, according to claim 1, further comprising:

a process for recording the predetermined manufacturing information about the material purchase, the forging process, the heat treatment process, the grinding process, and the surface treatment process of said component of said aerospace machine element product, in a database for management at the time of manufacturing so as to be related to the lot number of the component or the identification number specific to the component; and a process for recording said recorded information on the IC tag attached to said aerospace machine element product.

4. The quality management method of managing a rolling bearing for aerospace equipment, said bearing having an inner ring, an outer ring, and a rolling element arranged between said inner and outer rings, according to claim 1, wherein grease is enclosed in said aerospace machine element product at the time of assembling, and the assembling date of the aerospace machine element product is recorded on the IC tag attached to said aerospace machine element product.

5. The quality management method of managing a rolling bearing for aerospace equipment, said bearing having an inner ring, an outer ring, and a rolling element arranged between said inner and outer rings, according to claim 1, wherein information about whereabouts of said aerospace machine element product from the shipment to the delivery to the customer is recorded on the IC tag attached to said aerospace machine element product.

6. A quality management method of managing a rolling bearing for aerospace equipment, said bearing having an inner ring, an outer ring, and a rolling element arranged between said inner and outer rings, using a database storing any of specific information including any of information about a customer including various kinds of history management after a shipment and a delivery, information about a request from a customer and information about a manufacturer regarding the roller bearing, and predetermined manufacturing information about material purchase, a forging process, a heat treatment process, a grinding process and a surface treatment process regarding the roller bearing so as to be related to identification information, from which stored contents can be extracted using said identification information, said database being connected to various information processing devices located in a manufacturing factory, storage, and sales offices via a manufacturing side network and to information processing devices and portable terminals located in a customer company via a customer side network, and an IC tag to and from which information can be recorded and read, said method comprising:

a process for attaching said IC tag to either one of said inner ring or said outer ring at the time of manufacturing or at the completion of the manufacturing of the aerospace machine element product;

a process for writing identification information individually for said inner ring, said outer ring, and said rolling element based on said database at the time of shipment or before delivery to the customer, and recording at least one of specific information including any of information about a customer, information about the request from the customer and information regarding manufacturer, and at least one information about a manufactured date, a manufactured place, the brand of enclosed grease, the clearance between the components, and rust-preventing and packaging information, and instructions for handling regarding the roller bearing, on the IC tag attached to either one of said inner ring or said outer ring; and an information reading and using process for executing any of confirmation of the specific information including the information about the customer, the information about the request from the customer, or the information about the manufacturer, confirmation of a purchased material, confirmation of a manufacturing process, at least one of confirmation of processing condition and material information, and confirmation of an inspected result from the information read from the IC tag, or from the information obtained by comparing the read information to said database at both said manufacturing side and said customer company.

7. The quality management method of managing a rolling bearing for aerospace equipment, said bearing having an inner ring, an outer ring, and a rolling element arranged between said inner and outer rings, according to claim 6, further comprising:

a process for recording the predetermined manufacturing information about the material purchase, the forging process, the heat treatment process, the grinding process and the surface treatment process of said component of said aerospace machine element product, on an IC tag for a manufacturing process, prepared for each lot number of said component at each process; and a process for reading the information recorded on said IC tag for the manufacturing process and recording a part or all of the read information on the IC tag attached to said aerospace machine element product, wherein the manufacturing information recorded on said IC tag for the manufacturing process includes at least one of processing condition information and material information in at least one of the forging process, the heat treatment process, the grinding process, and surface treatment process.

8. The quality management method of a rolling bearing for aerospace equipment, said bearing having an inner ring, an outer ring, and a rolling element arranged between said inner and outer rings, according to claim 6, further comprising:
a process for recording the predetermined manufacturing information about the material purchase, the forging process, the heat treatment process, the grinding process, and the surface treatment process of said component of said aerospace machine element product, in a database for management at the time of manufacturing so as to be related to the lot number of the component or the identification number specific to the component; and
a process for recording said recorded information on the IC tag attached to said aerospace machine element product.

9. A quality management method of managing an aerospace machine element product having a plurality of components manufactured through material purchase, a forging process, a heat treatment process, a grinding process and a surface treatment process, assembled and individually inspected, comprising, for said each component,
a process for recording the material lot number of a corresponding material lot and information about a purchased material, on an IC tag prepared with respect to each material lot, at the time of purchasing of the component;
a process for preparing said IC tag for each material lot or an IC tag succeeding the recorded information of the IC tag for each material lot with respect to each forging lot and recording the forging lot number of a corresponding forging lot and information provided at the forging process on the IC tag at said forging process;
a process for preparing said IC tag for each forging lot or an IC tag succeeding the recorded information of the IC tag for each forging lot with respect to each heat treatment lot and recording the heat treatment lot number of a corresponding heat treatment lot and information provided at the heat treatment process on the IC tag at said heat treatment process;
a process for preparing said IC tag for each heat treatment lot or an IC tag succeeding the recorded information of the IC tag for each heat treatment lot with respect to each grinding lot and recording the processing condition of a corresponding grinding lot on the IC tag at said grinding process;
a process for preparing said IC tag for each grinding lot or an IC tag succeeding the recorded information of the IC tag for each grinding lot with respect to each surface treatment lot and recording surface treatment information of a corresponding surface treatment lot at said surface treatment process;
a process for preparing said IC tag for each surface treatment lot or an IC tag succeeding the recorded information of the IC tag for each heat treatment lot with respect to each component or each group of the same kind that is the unit of the inspection, and recording a corresponding surface treatment lot and information provided at the inspection process on the IC tag at said inspection process after the surface treatment process; and
a process for attaching an IC tag to each aerospace machine element product in which said components are assembled during the assembling operation, recording at least a manufacturing number among the manufacturing number specific to each aerospace machine element product, and the recorded information on the IC tag after the inspection process of each component of the aerospace machine element product, on the IC tag attached to the aerospace machine element product, and recording the recorded information of the IC tag after said inspection process of each component of the aerospace machine element product, and inspected information of the completed aerospace machine element product, in said database so as to be related to said manufacturing number.

10. The quality management method of managing the aerospace machine element product according to claim 9, wherein said IC tag prepared for each material lot, said IC tag prepared for each forging lot, said IC tag prepared for each heat treatment process, and said IC tag prepared for each surface treatment process are attached to a container containing the plurality of materials in the same material lot, a container containing the plurality of components in the same forging lot, a container containing the plurality of components in the same heat treatment lot, and a container containing the plurality of components in the same surface treatment lot, respectively.

11. The quality management method of managing the aerospace machine element product according to claim 9, wherein said aerospace machine element product comprises a component other than the component manufactured through the material purchase, the forging process, the heat treatment process, the grinding process, and the surface treatment process, and information about said other component is recorded so as to be related to the manufacturing number or the lot number in said database after said aerospace machine element product has been assembled.

12. A quality management method of managing an aerospace machine element product comprising a plurality of components manufactured through material purchase, a forging process, a heat treatment process, a grinding process and a surface treatment process, assembled and inspected with respect to each lot, comprising, for each component,
a process for recording the material lot number of a corresponding material lot and information about a purchased material, on an IC tag prepared with respect to each material lot, at the time of purchasing of the component;
a process for preparing said IC tag for each material lot or an IC tag succeeding the recorded information of the IC tag for each material lot with respect to each forging lot and recording the forging lot number of a corresponding forging lot and information provided at the forging process on the IC tag at said forging process;
a process for preparing said IC tag for each forging lot or an IC tag succeeding the recorded information of the IC tag for each forging lot with respect to each heat treatment lot and recording the heat treatment lot number of a corresponding heat treatment lot and information provided at the heat treatment process on the IC tag at said heat treatment process;
a process for preparing said IC tag for each heat treatment lot or an IC tag succeeding the recorded information of the IC tag for each heat treatment lot with respect to each grinding lot and recording the grinding lot number of a corresponding grinding lot and information provided at the grinding process on the IC tag at said grinding process;
a process for preparing said IC tag for each grinding lot or an IC tag succeeding the recorded information of the IC tag for each grinding lot with respect to each surface treatment lot and recording surface treatment information of a corresponding surface treatment lot on the IC tag at said surface treatment process;

a process for preparing said IC tag for each surface treatment or an IC tag succeeding the recorded information of the IC tag for each surface treatment lot with respect to each component or each group of the same kind that is the unit of the inspection, and recording a corresponding surface treatment lot number and information provided at the inspection process on the IC tag at said inspection process after the surface treatment process; and a process for attaching an IC tag to each aerospace machine element product in which said components are assembled during the assembling operation, recording at least a manufacturing lot number among the manufacturing lot number, and the recorded information on the IC tag after the inspection process of each component of the aerospace machine element product, on the IC tag, and recording the recorded information of the IC tag after the inspection process of each component of the aerospace machine element product, and inspected information of the completed aerospace machine element product, in said database so as to be related to said manufacturing lot number.

13. The quality management method of managing the aerospace machine element product according to claim 12, wherein said IC tag prepared for each material lot, said IC tag prepared for each forging lot, said IC tag prepared for each heat treatment process, and said IC tag prepared for each surface treatment process are attached to a container containing the plurality of materials in the same material lot, a container containing the plurality of components in the same forging lot, a container containing the plurality of components in the same heat treatment lot, and a container containing the plurality of components in the same surface treatment lot, respectively.

14. The quality management method of managing the aerospace machine element product according to claim 12, wherein said aerospace machine element product comprises a component other than the component manufactured through the material purchase, the forging process, the heat treatment process, the grinding process, and the surface treatment process, and information about said other component is recorded so as to be related to the manufacturing number or the lot number in said database after said aerospace machine element product has been assembled.

* * * * *